(12) United States Patent
Chern

(10) Patent No.: US 11,500,151 B2
(45) Date of Patent: Nov. 15, 2022

(54) SEMICONDUCTOR ARRANGEMENT AND METHOD OF MAKING

(71) Applicant: TAIWAN SEMICONDUCTOR MANUFACTURING COMPANY LIMITED, Hsin-Chu (TW)

(72) Inventor: Chan-Hong Chern, Palo Alto, CA (US)

(73) Assignee: TAIWAN SEMICONDUCTOR MANUFACTURING COMPANY LIMITED, Hsinchu (TW)

(*) Notice: Subject to any disclaimer, the term of this patent is extended or adjusted under 35 U.S.C. 154(b) by 0 days.

(21) Appl. No.: 17/181,205

(22) Filed: Feb. 22, 2021

(65) Prior Publication Data

US 2022/0269000 A1    Aug. 25, 2022

(51) Int. Cl.
G02B 6/13        (2006.01)
G02B 6/12        (2006.01)
G02B 6/293       (2006.01)

(52) U.S. Cl.
CPC ........... *G02B 6/12007* (2013.01); *G02B 6/13* (2013.01); *G02B 6/29395* (2013.01)

(58) Field of Classification Search
None
See application file for complete search history.

(56) References Cited

U.S. PATENT DOCUMENTS

| 2015/0033094 A1 | 1/2015 | Kiefer et al. |
| 2018/0231714 A1 | 8/2018 | Collins |
| 2021/0294130 A1* | 9/2021 | Lin .................. G02F 1/225 |

FOREIGN PATENT DOCUMENTS

| CN | 109212666 A | * | 1/2019 | ............... G02B 6/12 |
| TW | 201530945 A |   | 8/2015 | |
| TW | 202004925 A |   | 1/2020 | |
| TW | 202038400 A |   | 10/2020 | |
| TW | 202105864 A |   | 2/2021 | |

* cited by examiner

*Primary Examiner* — Chad H Smith
(74) *Attorney, Agent, or Firm* — Cooper Legal Group, LLC

(57) ABSTRACT

A semiconductor arrangement is provided and includes a first dielectric layer over an optical device. A first metallization layer is over the first dielectric layer, and a first conductive line is in the first metallization layer. A first conductive via is in the first metallization layer and contacts the first conductive line. A second metallization layer is over the first metallization layer. A second conductive line is in the second metallization layer and contacts the first conductive via at a first interface. A heater is over the optical device and has a lowermost surface below the first interface and an uppermost surface above the first interface.

20 Claims, 21 Drawing Sheets

View A-A

View B-B

SEMICONDUCTOR ARRANGEMENT AND METHOD OF MAKING

BACKGROUND

The rapid expansion in the use of the Internet has resulted in a demand for high speed communications links and semiconductor arrangements, including optical links and semiconductor arrangements. Optical links using fiber optics have many advantages compared to electrical links: large bandwidth, high noise immunity, reduced power dissipation, and minimal crosstalk. Optoelectronic integrated circuits made of silicon are useful since they can be fabricated in the same foundries used to make very-large scale integrated (VLSI) circuits. Optical communications technology is typically operating in the 1.3 µm and 1.55 µm infrared wavelength bands. The optical properties of silicon are well suited for the transmission of optical signals, due to the transparency of silicon in the infrared wavelength bands of 1.31 µm and 1.55 µm and the high refractive index of silicon.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
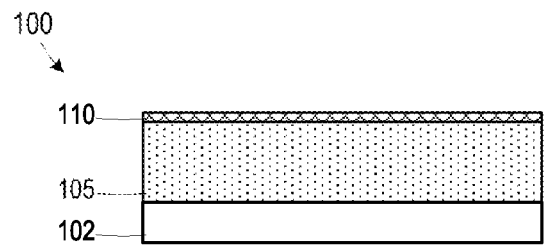
FIGS. 1-11 illustrate cross-sectional views of a semiconductor arrangement at various stages of fabrication, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the semiconductor arrangement in use or operation in addition to the orientation depicted in the figures. The apparatus may be otherwise oriented (rotated 90 degrees or at other orientations) and the spatially relative descriptors used herein may likewise be interpreted accordingly.

One or more techniques for fabricating a semiconductor arrangement are provided herein. Silicon waveguides with sub-micron dimensions are able to confine infrared light (1>~700 nm) due to the strong refractive index of silicon in contrast to its cladding layers ($n_{r\_Si}$=~3.47 vs $n_{r\_SiO2}$=~1.45). Silicon has a significant thermo-optic coefficient (dn/dT>2.5×10$^{-4}$ K$^{-1}$), causing it to be sensitive to temperature variations, which may cause a wavelength shift in a silicon-based optoelectronic device. Some optical devices, such as micro-ring resonators and micro-ring modulators are sensitive to process variations, which may also induce wavelength shifts. In some embodiments, a heater is provided over an optical device and controlled to compensate for wavelength shifts arising from temperature or process variations.

FIGS. 1-14 illustrate a semiconductor arrangement 100 at various stages of fabrication, in accordance with some embodiments. FIGS. 1-11 and 13 illustrate cross-sectional views of embodiments of the semiconductor arrangement 100. FIGS. 12 and 14 illustrate top views of embodiments of the semiconductor arrangement 100.

Turning to FIG. 1, a plurality of layers used in the formation of a semiconductor arrangement 100 are illustrated, in accordance with some embodiments. The plurality of layers is formed over a semiconductor layer 105. In some embodiments, the semiconductor layer 105 is part of a substrate 102 comprising at least one of an epitaxial layer, a single crystalline semiconductor material, such as at least one of Si, Ge, SiGe, InGaAs, GaAs, InSb, GaP, GaSb, InAlAs, GaSbP, GaAsSb, or InP, a silicon-on-insulator (SOI) structure, a wafer, or a die formed from a wafer. In some embodiments, the semiconductor layer 105 comprises at least one of crystalline silicon or other suitable materials.

In some embodiments, the plurality of layers comprises a mask layer 110 formed over the semiconductor layer 105. According to some embodiments, the mask layer 110 comprises a plurality of individually formed layers that together define a mask stack. In some embodiments, the mask layer 110 comprises at least one of a hard mask layer, a bottom antireflective coating (BARC) layer, an organic planarization layer (OPL), or a photoresist layer.

The hard mask layer is formed by at least one of physical vapor deposition (PVD), sputtering, chemical vapor deposition (CVD), low pressure CVD (LPCVD), atomic layer chemical vapor deposition (ALCVD), ultrahigh vacuum CVD (UHVCVD), reduced pressure CVD (RPCVD), atomic layer deposition (ALD), molecular beam epitaxy (MBE), liquid phase epitaxy (LPE), spin on, growth, or other suitable techniques. In some embodiments, the hard mask layer comprises at least one of silicon, nitrogen, or other suitable materials. In some embodiments, the BARC layer is a polymer layer that is applied using a spin coating process.

In some embodiments, the OPL comprises a photo-sensitive organic polymer that is applied using a spin coating process. In some embodiments, the OPL comprises a dielectric layer. In some embodiments, the photoresist layer is formed by at least one of spinning, spray coating, or other suitable techniques, according to some embodiments.

The photoresist is a negative photoresist or a positive photoresist. With respect to a negative photoresist, regions of the negative photoresist become insoluble when illuminated by a light source, such that application of a solvent to the negative photoresist during a subsequent development stage removes non-illuminated regions of the negative photoresist. A pattern formed in the negative photoresist is thus a negative image of a pattern defined by opaque regions of a template, such as a mask, between the light source and the negative photoresist. In a positive photoresist, illuminated regions of the positive photoresist become soluble and are removed via application of a solvent during development. Thus, a pattern formed in the positive photoresist is a positive image of opaque regions of the template, such as a mask, between the light source and the positive photoresist. One or more etchants have a selectivity such that the one or more etchants remove or etch away one or more layers exposed or not covered by the photoresist at a greater rate than the one or more etchants remove or etch away the photoresist. Accordingly, an opening in the photoresist allows the one or more etchants to form a corresponding opening in the one or more layers under the photoresist, and thereby transfer a pattern in the photoresist to the one or more layers under the photoresist. The photoresist is stripped or washed away after the pattern transfer.

Figure 2:
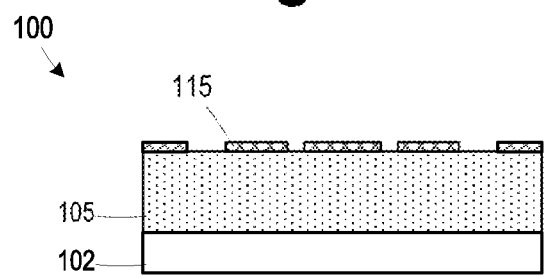

Referring to FIG. 2, the mask layer 110 is patterned to define a mask 115, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 115 and expose portions of the semiconductor layer 105 under the mask 115.

Figure 3:
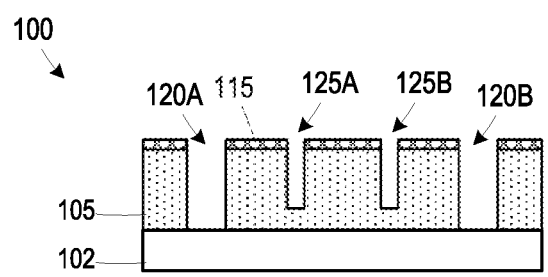

Referring to FIG. 3, an etching processes is performed to pattern the semiconductor layer 105 using the mask 115 as an etch template to define trenches 120A, 120B, 125A, 125B, in accordance with some embodiments. The etching process comprises at least one of a plasma etching process, a reactive ion etching (RIE) process, or other suitable techniques. The etch process comprises an anisotropic etch process in accordance with some embodiments.

Figure 4:
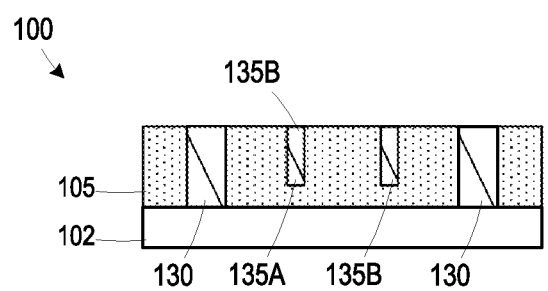

Referring to FIG. 4, a deposition process is performed to deposit a dielectric material in the trenches 120A, 120B, 125A, 125B and a planarization process is performed to remove portions of the dielectric material extending outside the trenches 120A, 120B, 125A, 125B and to remove the mask 115, in accordance with some embodiments. Remaining portions of the dielectric material define isolation structures 130, 135A, 135B, such as shallow trench isolation (STI) structures. In some embodiments, the dielectric material forming the isolation structures 130, 135A, 135B comprises at least one of silicon oxide or other suitable materials.

Figure 5:
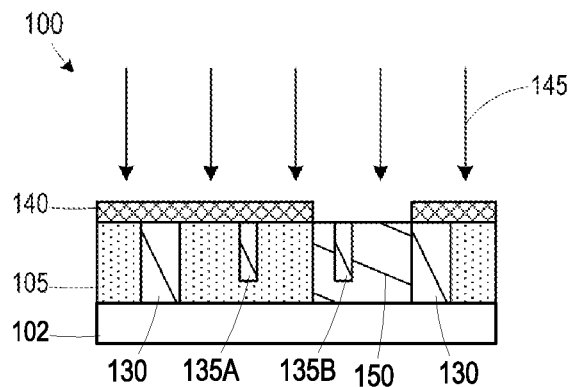

Referring to FIG. 5, an implantation mask 140 is formed over the semiconductor layer 105 and an implantation process 145 is performed using the implantation mask 140 as an implantation template to form a first doped region 150 in the semiconductor layer 105, in accordance with some embodiments. In some embodiments, the first doped region 150 comprises an n-type impurity, such as at least one of phosphorous, arsenic, or a different n-type dopant and has a lightly doped (N) concentration.

Figure 6:
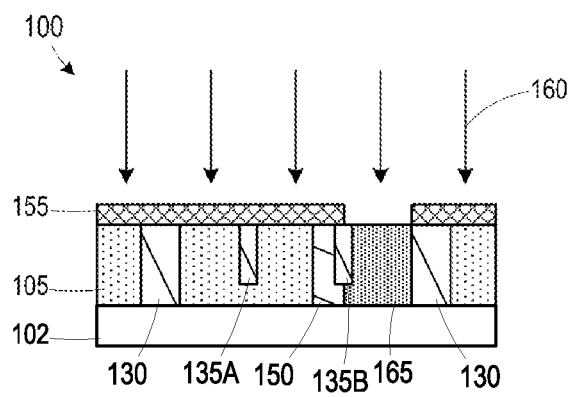

Referring to FIG. 6, the implantation mask 140 is removed, an implantation mask 155 is formed over the semiconductor layer 105, and an implantation process 160 is performed using the implantation mask 155 as an implantation template to form a second doped region 165 in the semiconductor layer 105, in accordance with some embodiments. In some embodiments, the second doped region 165 comprises an n-type impurity, such as at least one of phosphorous, arsenic, or a different n-type dopant and has a medium doped (N+) concentration greater than the concentration of the first doped region 150.

Figure 7:
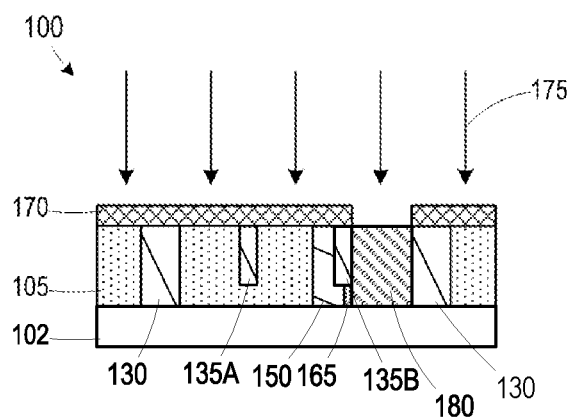

Referring to FIG. 7, the implantation mask 155 is removed, an implantation mask 170 is formed over the semiconductor layer 105, and an implantation process 175 is performed using the implantation mask 170 as an implantation template to form a third doped region 180 in the semiconductor layer 105, in accordance with some embodiments. In some embodiments, the third doped region 180 comprises an n-type impurity, such as at least one of phosphorous, arsenic, or a different n-type dopant and has a highly doped (N++) concentration greater than the concentration of the first doped region 150 and greater than the concentration of the second doped region 165.

According some embodiments, at least one anneal processes is performed to activate at least one of the dopants in the first doped region 150, the dopants in the second doped region 165, or the dopants in the third doped region 180. In some embodiments, an anneal process is performed after formation of the third doped region 180. Alternatively, intermediate anneal processes are performed after at least one of the implantation processes 145 or 160.

Figure 8:
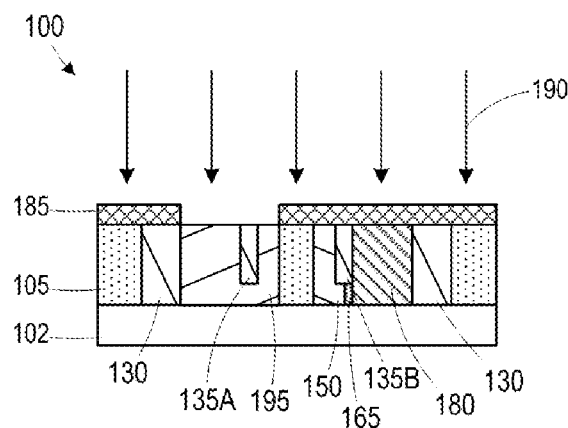

Referring to FIG. 8, the implantation mask 170 is removed, an implantation mask 185 is formed over the semiconductor layer 105, and an implantation process 190 is performed using the implantation mask 185 as an implantation template to form a fourth doped region 195 in the semiconductor layer 105, in accordance with some embodiments. In some embodiments, the fourth doped region 195 comprises a p-type impurity, such as at least one of boron, $BF_2$, or other suitable p-type dopant and has a lightly doped (P) concentration.

Figure 9:
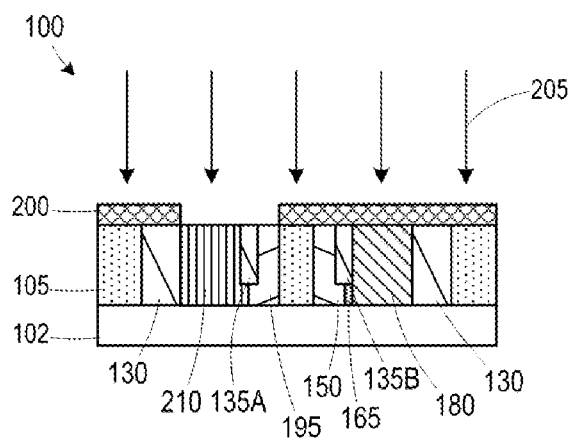

Referring to FIG. 9, the implantation mask 185 is removed, an implantation mask 200 is formed over the semiconductor layer 105, and an implantation process 205 is performed using the implantation mask 200 as an implantation template to form a fifth doped region 210 in the semiconductor layer 105, in accordance with some embodiments. In some embodiments, the fifth doped region 210 comprises a p-type impurity, such as at least one of boron, $BF_2$, or other suitable p-type dopant and has a medium doped (P+) concentration greater than the concentration of the fourth doped region 195.

Figure 10:
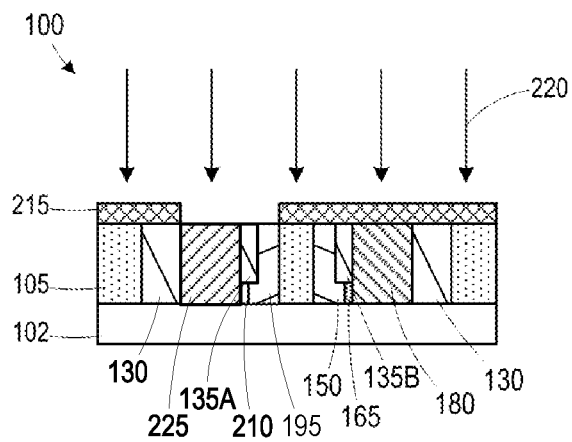

Referring to FIG. 10, the implantation mask 200 is removed, an implantation mask 215 is formed over the semiconductor layer 105, and an implantation process 220 is performed using the implantation mask 215 as an implantation template to form a sixth doped region 225 in the semiconductor layer 105, in accordance with some embodiments. In some embodiments, the sixth doped region 225 comprises a p-type impurity, such as at least one of boron, $BF_2$, or other suitable p-type dopant and has a highly doped (P++) concentration greater than the concentration of the fourth doped region 195 and greater than the concentration of the fifth doped region 210.

Figure 11:
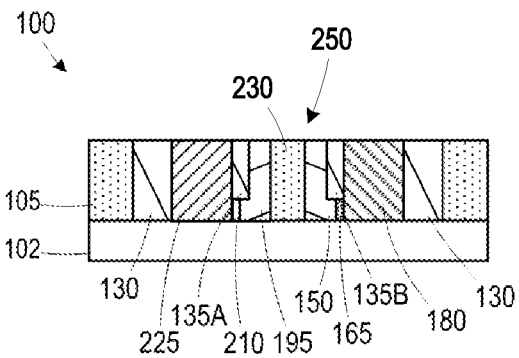
Figure 12:
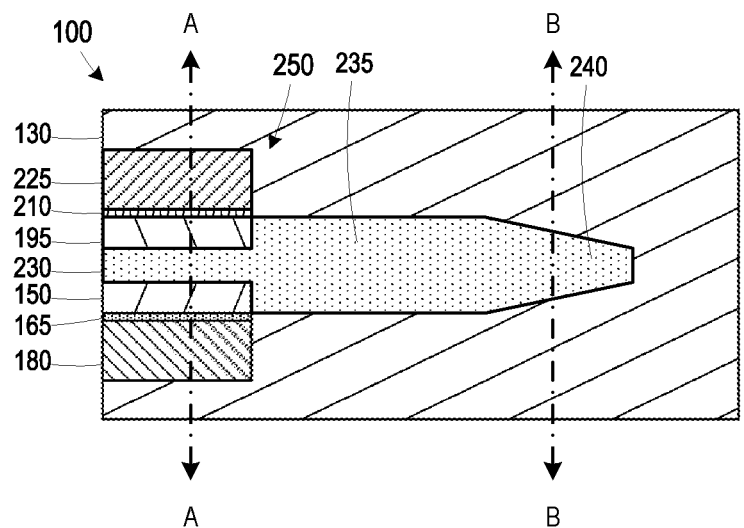
FIG. 12 illustrates a top view of a semiconductor arrangement at a stage of fabrication, in accordance with some embodiments.

Referring to FIGS. 11 and 12, the implantation mask 215 is removed and at least one anneal process is performed to activate at least one of the dopants in the fourth doped region 195, the dopants in the fifth doped region 210, or the dopants in the sixth doped region 225. In some embodiments, an anneal process is performed after formation of the sixth doped region 225. Alternatively, intermediate anneal processes are performed after at least one of the implantation processes 190 or 205.

As illustrated in FIGS. 11 and 12, the first doped region 150 does not abut the fourth doped region 195, resulting in an intrinsic region 230 that extends into a waveguide 235 formed in the semiconductor layer 105 and bounded by the isolation structure 130. In some embodiments, the intrinsic region 230 and the waveguide 235 comprise undoped portions of the semiconductor layer 105.

Figure 13:
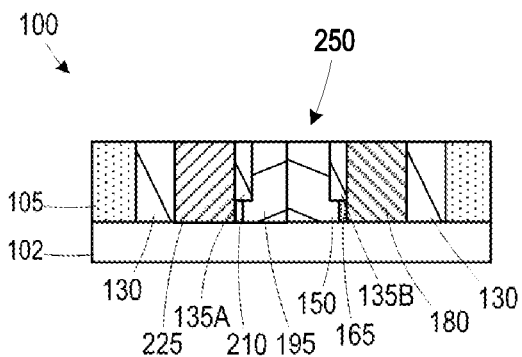
FIG. 13 illustrates a cross-sectional view of a semiconductor arrangement at a stage of fabrication, in accordance with some embodiments.
Figure 14:
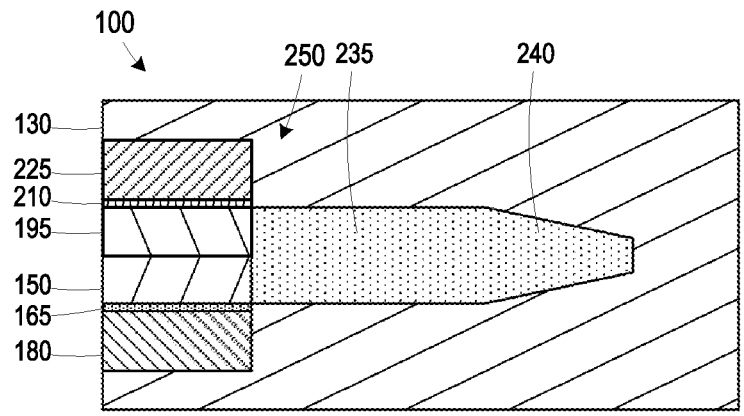
FIG. 14 illustrates a top view of a semiconductor arrangement at a stage of fabrication, in accordance with some embodiments.

Referring to FIGS. 13 and 14, according to some embodiments, the intrinsic region 230 is omitted. FIG. 14 is a top view of the semiconductor arrangement 100 shown in FIG. 13. According to some embodiments, to omit the intrinsic region 230 the implantation mask 140 in FIG. 5 and the implantation mask 185 in FIG. 8 are defined such that the first doped region 150 and the fourth doped region 195 abut one another.

According to some embodiments, the first doped region 150, the second doped region 165, the third doped region 180, the fourth doped region 195, the fifth doped region 210, the sixth doped region 225, the intrinsic region 230, and the waveguide 235 illustrated in FIGS. 11-14 are elements of an optical device 250. In some embodiments, the waveguide 235 has a tapered end portion 240. In some embodiments, the degree of taper varies depending on a particular implementation or use of the optical device. According to some embodiments, at least some of the semiconductor arrangement 100 comprises the optical device 250.

According to some embodiments, the third doped region 180 and the sixth doped region 225 are contact regions for the optical device 250. In some embodiments, providing electrical signals to the contact regions defined by the third doped region 180 and the sixth doped region 225 activates the optical device 250 to generate an optical signal in the waveguide 235. The optical device 250 is sensitive to temperature variations. To allow tuning of the optical device 250, such as to facilitate conduction of conduct certain wavelengths in the waveguide 235, a heater is provided above the optical device 250.

FIGS. 15-35 illustrate cross-sectional views of the semiconductor arrangement 100 at various stages of fabrication whereby a heater 375 is formed over the optical device 250, in accordance with some embodiments, where the left side of the figures correspond to views at A-A in FIG. 12 and the right side of the figures correspond to views at B-B in FIG. 12.

Figure 15:
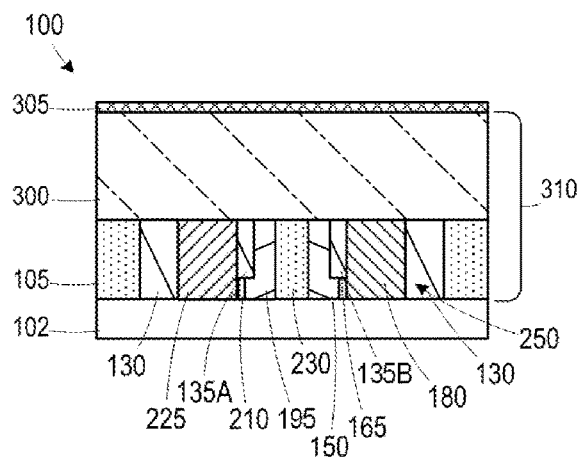
FIGS. 15-35 illustrate cross-sectional views of a semiconductor arrangement at various stages of fabrication, in accordance with some embodiments.
Figure 15:
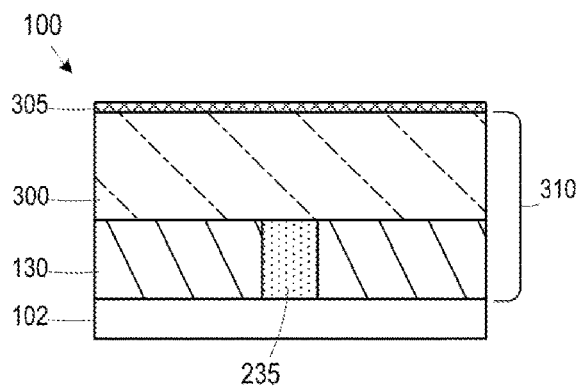

Referring to FIG. 15 a dielectric layer 300 is formed over, among other things, the semiconductor layer 105 and the waveguide 235, and a mask layer 305 is formed over the dielectric layer 300, in accordance with some embodiments. The semiconductor layer 105 and dielectric layer 300 define a device layer 310 in which the optical device 250 is formed.

According to some embodiments, the mask layer 305 comprises a plurality of individually formed layers that together define a mask stack. In some embodiments, the mask layer 305 comprises at least one of a hard mask layer, a bottom antireflective coating (BARC) layer, an organic planarization layer (OPL), or a photoresist layer. In some embodiments, the materials for the dielectric layer 300 comprise at least one of Si, 0, C, or H, such as SiCOH and SiOC, or other suitable materials. Organic material such as polymers may be used for the dielectric layer 300. In some embodiments, the dielectric layer 300 comprises one or more layers of at least one of a carbon-containing material, organo-silicate glass, a porogen-containing material, or other suitable materials. The dielectric layer 300 comprises nitrogen in some embodiments. In some embodiments, the dielectric layer 300 is formed by at least one of PVD, sputtering, CVD, LPCVD, ALCVD, UHVCVD, RPCVD, ALD, MBE, LPE, spin on, growth, or other suitable techniques.

Figure 16:
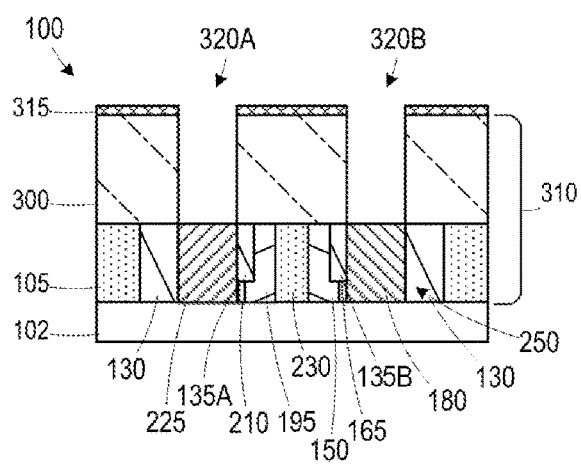
Figure 16:
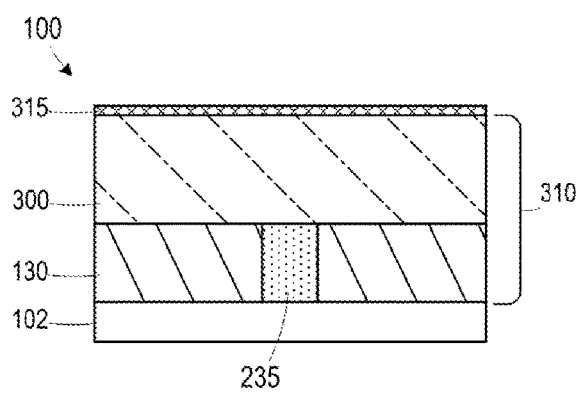

Referring to FIG. 16, the mask layer 305 is patterned to define a mask 315 and an etching processes is performed to pattern the dielectric layer 300 using the mask 315 as an etch template to define contact openings 320A, 320B in the dielectric layer 300, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 315 and expose portions of the dielectric layer 300 under the mask 315. The etching process comprises at least one of a plasma etching process, a reactive ion etching (RIE) process, or other suitable techniques. The etch process comprises an anisotropic etch process in accordance with some embodiments.

Figure 17:
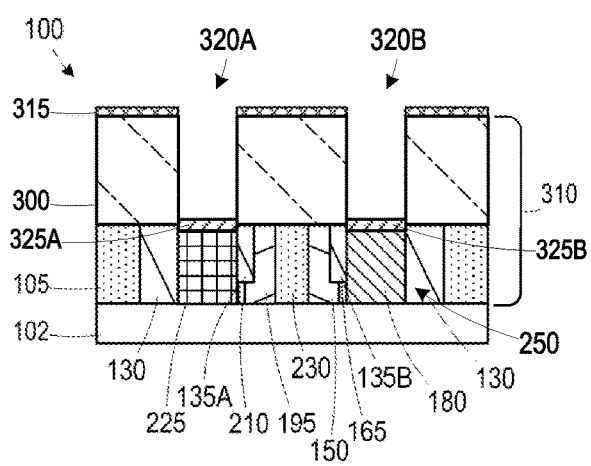
Figure 17:
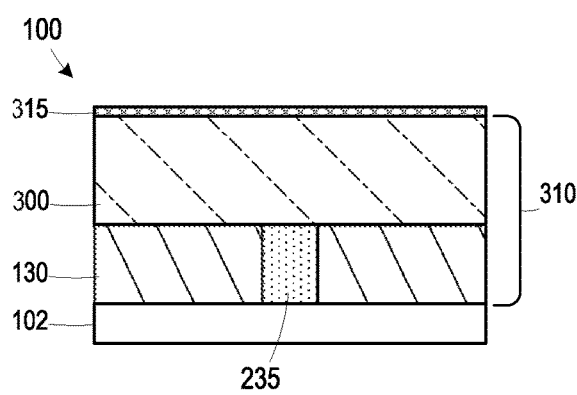

Referring to FIG. 17, silicide layers 325A, 325B are formed on upper surfaces of the third doped region 180 and the sixth doped region 225, in accordance with some embodiments. In some embodiments, the silicide layers 325A, 325B are formed by depositing a conformal layer of a refractory metal over the semiconductor arrangement 100 and performing at least one of an etch process, a planarization process, or other suitable techniques to remove portions of the conformal layer not positioned in the contact openings 320A, 320B. The refractory metal comprises at least one of nickel, platinum, cobalt, or other suitable materials, according to some embodiments. In some embodiments, different refractory metals are selected for each of the contact openings 320A, 320B. An annealing process is performed to cause the refractory metal to react with underlying silicon-containing material to form a metal silicide, and an etch process is performed to remove unreacted portions of the layer of refractory metal, according to some embodiments. In some embodiments, an additional annealing process is performed to form a final phase of the metal silicide. The silicide formation process consumes some of the material of the third doped region 180 and the sixth doped region 225, according to some embodiments.

Figure 18:
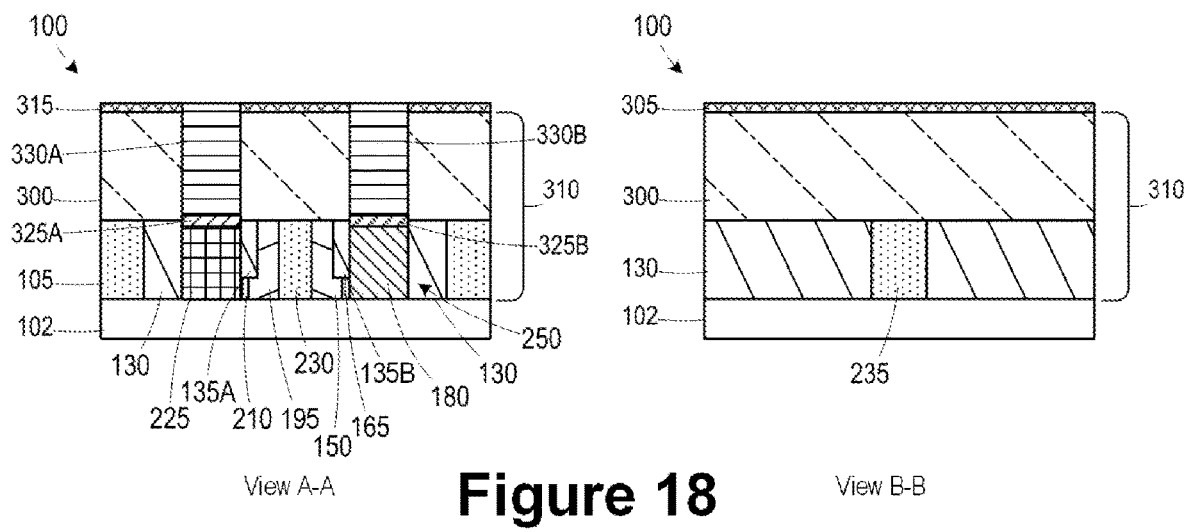

Referring to FIG. 18, conductive contacts 330A, 330B are formed in the contact openings 320A, 320B, in accordance with some embodiments. In some embodiments, the conductive contacts 330A, 330B are formed by at least one of PVD, sputtering, CVD, LPCVD, ALCVD, UHVCVD, RPCVD, ALD, MBE, LPE, spin on, growth, or other suitable techniques. In some embodiments, at least one of the conductive contacts 330A, 330B comprises at least one of tungsten, aluminum, copper, cobalt, or other suitable materials. In some embodiments, at least one of the conductive contacts 330A, 330B comprises a plurality of layers, such as a barrier layer, a seed layer, and a conductive fill layer. In some embodiments, a planarization process, such as chemical mechanical planarization (CMP), is performed to remove material of the conductive contacts 330A, 330B extending outside the contact openings 320A, 320B. In some embodiments, the planarization process removes the mask 315.

Figure 19:
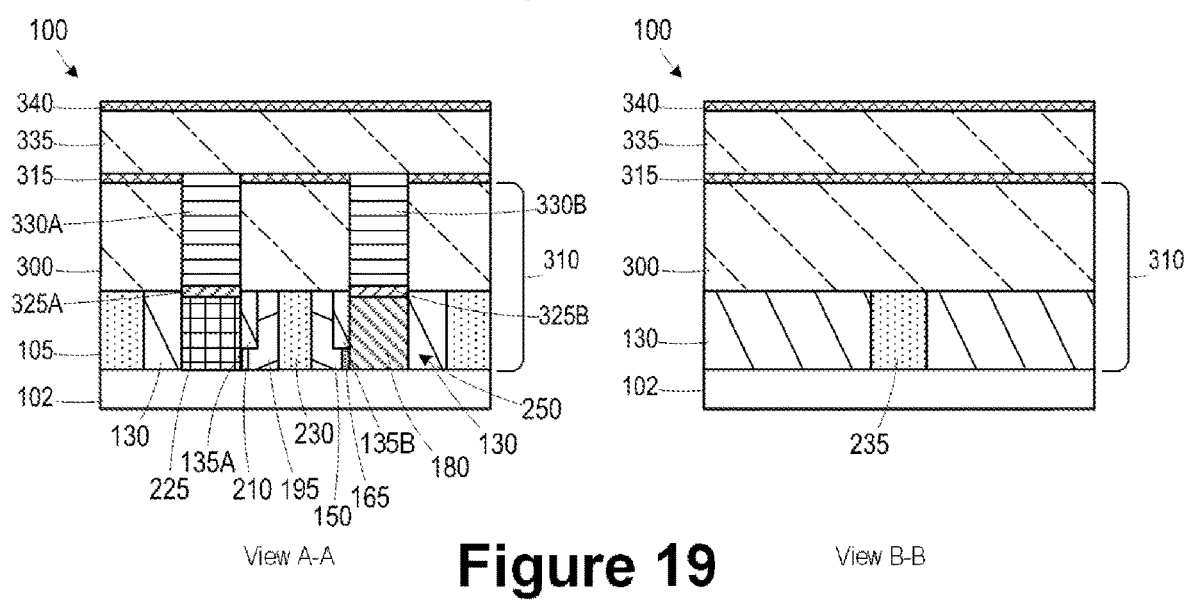

Referring to FIG. 19 a dielectric layer 335 is formed over the dielectric layer 300, and a mask layer 340 is formed over the dielectric layer 335, in accordance with some embodiments. In some embodiments, the mask layer 340 comprises at least one of a hard mask layer, a bottom antireflective coating (BARC) layer, an organic planarization layer (OPL), or a photoresist layer. In some embodiments, the materials for the dielectric layer 335 comprise at least one of Si, 0, C, or H, such as SiCOH and SiOC, or other suitable materials. Organic material such as polymers may be used for the dielectric layer 335. In some embodiments, the dielectric layer 335 comprises one or more layers of at least one of a carbon-containing material, organo-silicate glass, a porogen-containing material, or other suitable materials. The dielectric layer 335 comprises nitrogen in some embodiments. In some embodiments, the dielectric layer 335 is formed by at least one of PVD, sputtering, CVD, LPCVD, ALCVD, UHVCVD, RPCVD, ALD, MBE, LPE, spin on, growth, or other suitable techniques. In some embodiments, the dielectric layer 335 comprises a same material composition as the dielectric layer 300. In some embodiments, the dielectric layer 335 comprises a different material composition than the dielectric layer 300. In some embodiments, the material composition of the dielectric layer 335 is selected to have a different etch selectivity relative to the dielectric layer 300. In some such embodiments, the mask 315 is removed and the dielectric layer 335 directly contacts the dielectric layer 300.

Figure 20:
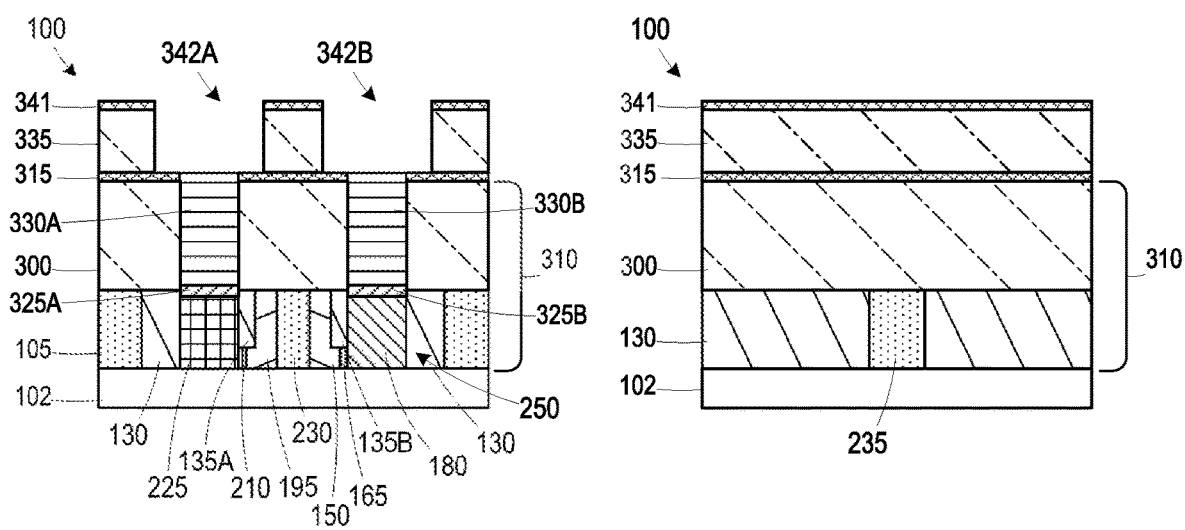

Referring to FIG. 20, the mask layer 340 is patterned to define a mask 341 and an etching processes is performed to pattern the dielectric layer 335 using the mask 341 as an etch template to define trench openings 342A, 342B in the dielectric layer 335, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 315 and expose portions of the dielectric layer 335 under the mask 341. The etching process comprises at least one of a plasma etching process, a reactive ion etching (RIE) process, or other suitable techniques. The etch process comprises an anisotropic etch process in accordance with some embodiments.

Figure 21:
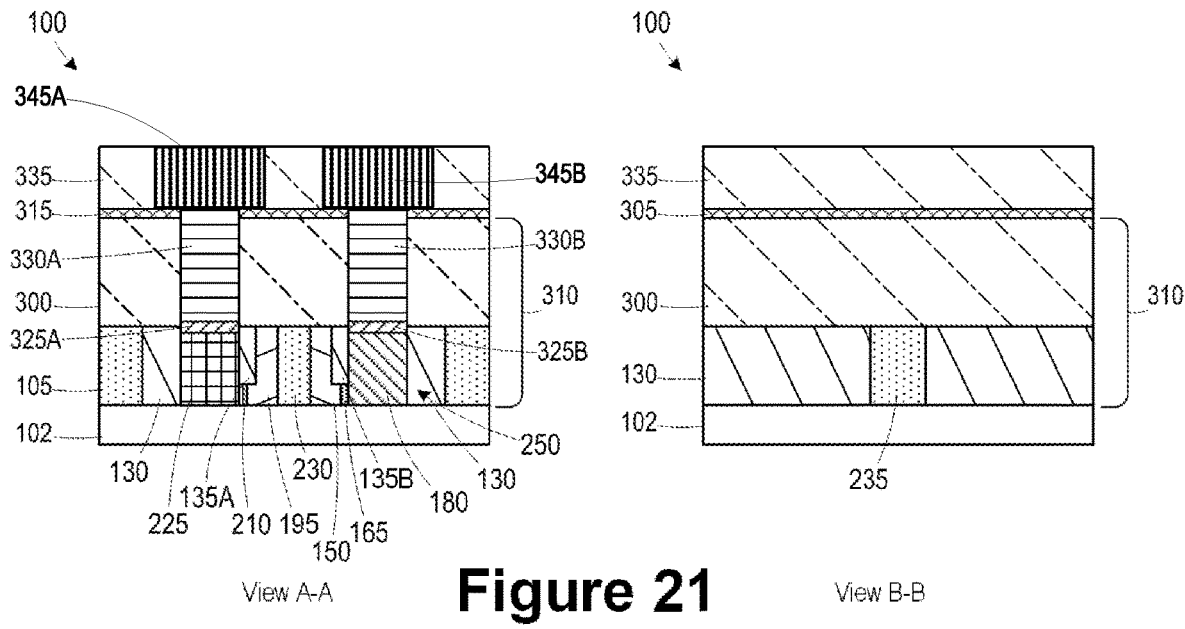

Referring to FIG. 21, conductive lines 345A, 345B are formed in the trench openings 342A, 342B and the mask 341 is removed, in accordance with some embodiments. In some embodiments, the conductive lines 345A, 345B are formed by at least one of PVD, sputtering, CVD, LPCVD, ALCVD, UHVCVD, RPCVD, ALD, MBE, LPE, spin on, growth, or other suitable techniques. In some embodiments, at least one of the conductive lines 345A, 345B comprises at least one of tungsten, aluminum, copper, cobalt, or other suitable materials. In some embodiments, at least one of the conductive lines 345A, 345B comprises a plurality of layers, such as a barrier layer, a seed layer, and a conductive fill layer. In some embodiments, a planarization process, such as CMP, is performed to remove material of the conductive lines 345A, 345B extending outside the trench openings 342A, 342B. In some embodiments, the planarization process removes the mask 341.

Figure 22:
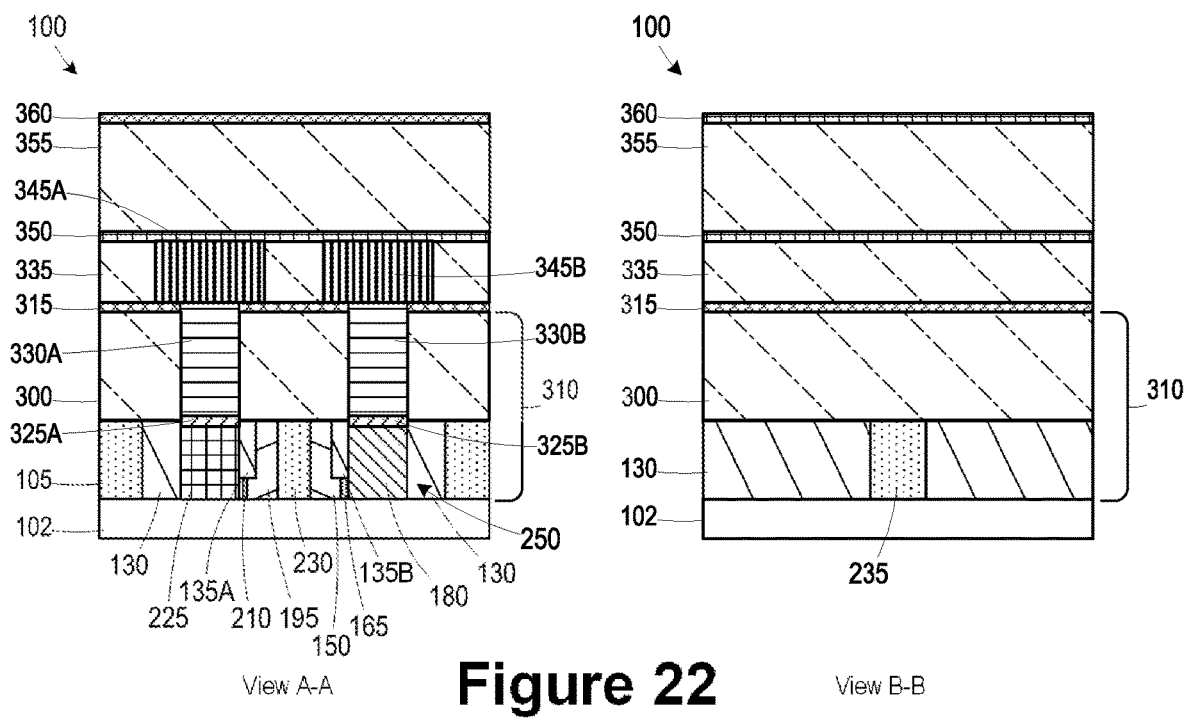

Referring to FIG. 22, an etch stop layer 350, a dielectric layer 355, and a mask layer 360 are formed over, among other things, the dielectric layer 335, in accordance with some embodiments. In some embodiments, the mask layer 360 comprises at least one of a hard mask layer, a bottom antireflective coating (BARC) layer, an organic planarization layer (OPL), or a photoresist layer. In some embodiments, the materials for the dielectric layer 355 comprise at least one of Si, O, C, or H, such as SiCOH and SiOC, or other suitable materials. Organic material such as polymers may be used for the dielectric layer 355. In some embodiments, the dielectric layer 355 comprises one or more layers of at least one of a carbon-containing material, organo-silicate glass, a porogen-containing material, or other suitable materials. The dielectric layer 355 comprises nitrogen in some embodiments. In some embodiments, the dielectric layer 355 is formed by at least one of PVD, sputtering, CVD, LPCVD, ALCVD, UHVCVD, RPCVD, ALD, MBE, LPE, spin on, growth, or other suitable techniques. In some embodiments, the etch stop layer 350 comprises a dielectric, such as at least one of an oxide, a nitride, or other suitable materials. In some embodiments, the etch stop layer 350 comprises at least one of Si, Al, Zr, Hf, Y, or other suitable materials. In some embodiments, the etch stop layer 350 is formed by at least one of PVD, sputtering, CVD, LPCVD, ALCVD, UHVCVD, RPCVD, ALD, MBE, LPE, spin on, growth, or other suitable techniques. In some embodiments, the dielectric layer 355 comprises a same material composition as the dielectric layer 335. In some embodiments, the dielectric layer 355 comprises a different material composition than the dielectric layer 335. In some embodiments, the etch stop layer 350 is omitted and the material composition of the dielectric layer 355 is selected to have a different etch selectivity relative to the dielectric layer 335.

Figure 23:
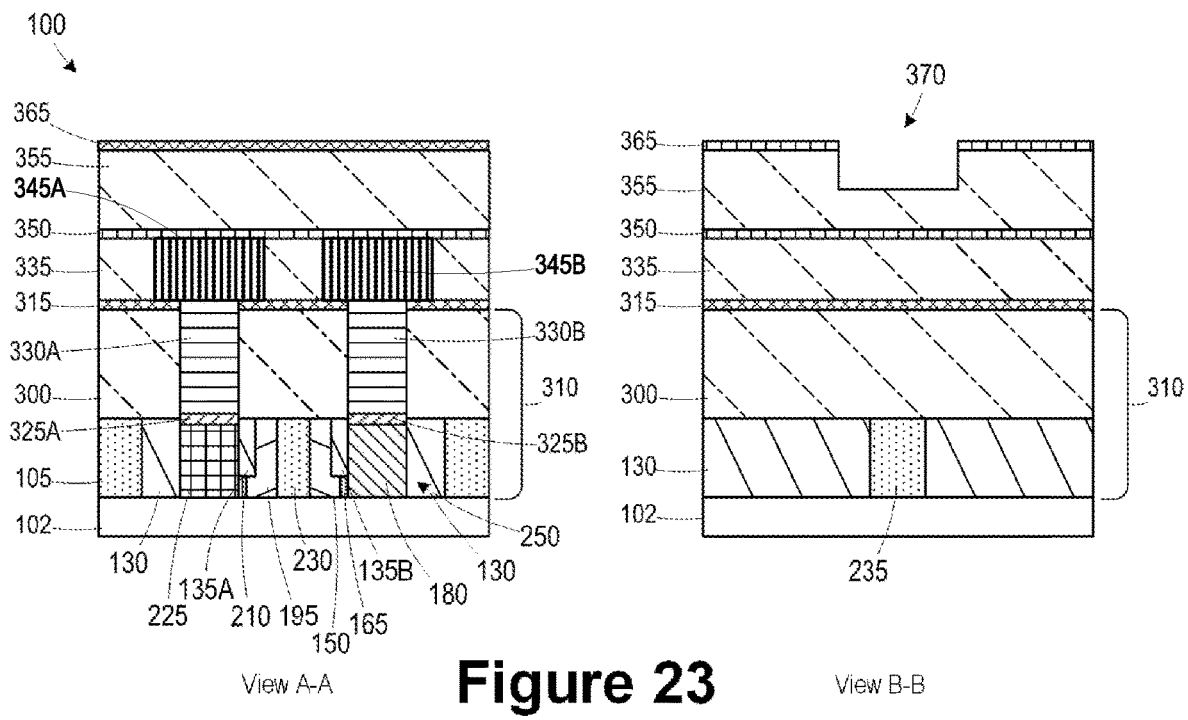

Referring to FIG. 23, the mask layer 360 is patterned to define a mask 365 and an etching processes is performed to pattern the dielectric layer 355 using the mask 365 as an etch template to define a heater recess 370 in the dielectric layer 355, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 365 and expose portions of the dielectric layer 355 under the mask 365. The etching process comprises at least one of a plasma etching process, a reactive ion etching (RIE) process, or other suitable techniques. The etch process comprises an anisotropic etch process in accordance with some embodiments.

Figure 24:
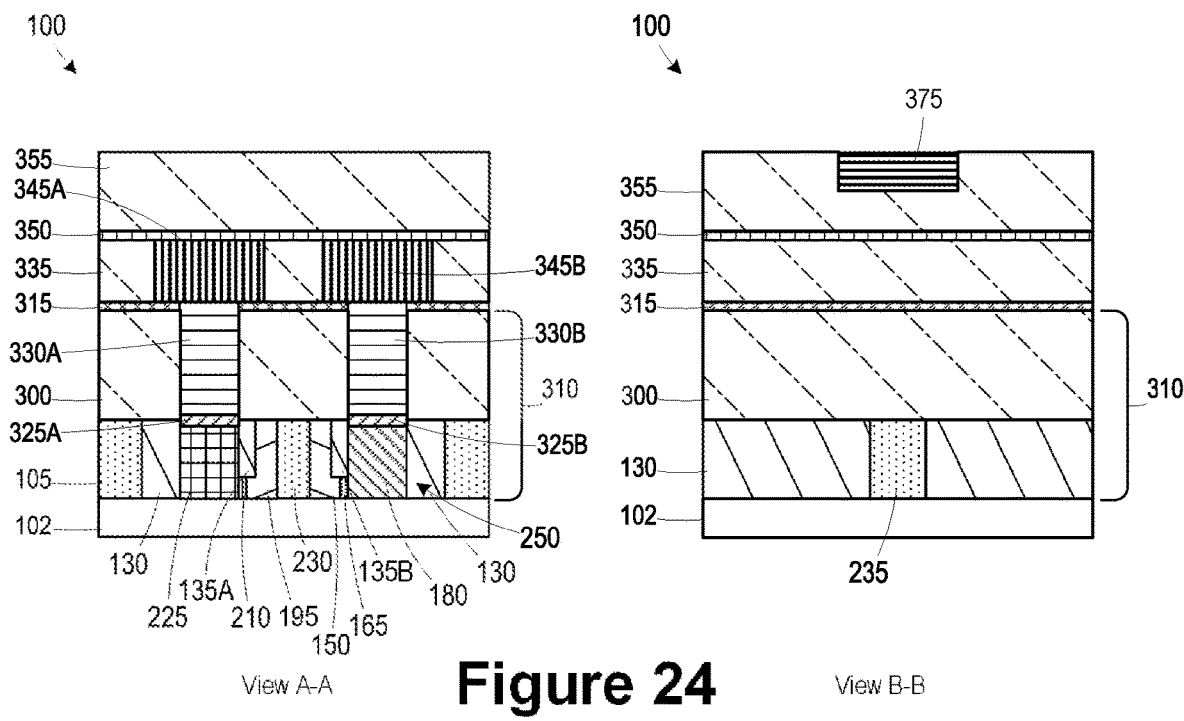

Referring to FIG. 24, the mask 365 is removed and a heater 375 is formed in the heater recess 370, in accordance with some embodiments. In some embodiments, the heater 375 is formed by at least one of PVD, sputtering, CVD, LPCVD, ALCVD, UHVCVD, RPCVD, ALD, MBE, LPE, spin on, growth, or other suitable techniques. In some embodiments, the heater 375 comprises at least one of tungsten, titanium nitride, tantalum nitride, aluminum, copper, cobalt, or other suitable materials. In some embodiments, the heater 375 comprises a plurality of layers, such as a barrier layer, a seed layer, and a conductive fill layer. In some embodiments, the heater 375 comprises a same material as at least one of the conductive lines 345A, 345B. In some embodiments, the heater 375 comprises a different material than at least one of the conductive lines 345A, 345B. In some embodiments, a planarization process, such as CMP, is performed to remove material of the heater 375 extending outside the heater recess 370. In some embodiments, the planarization process removes the mask 365.

Figure 25:
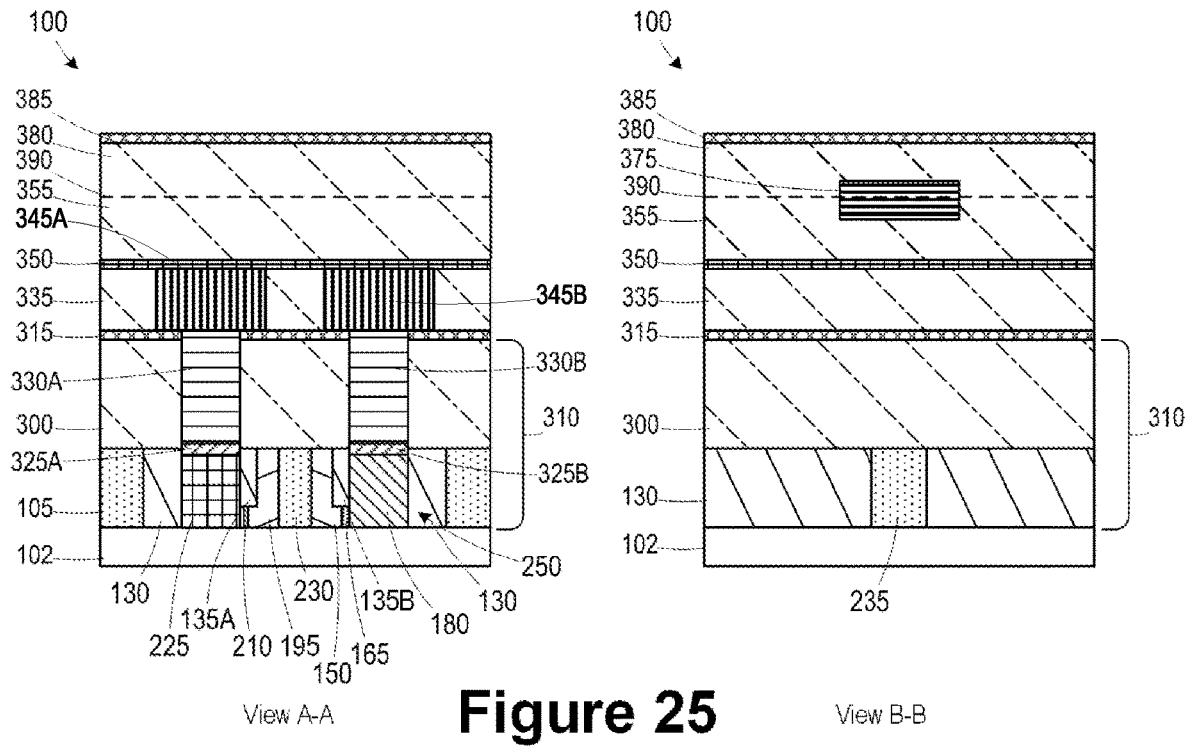

Referring to FIG. 25, a dielectric layer 380, and a mask layer 385 are formed over the dielectric layer 355 and the heater 375, in accordance with some embodiments. In some embodiments, the mask layer 385 comprises at least one of a hard mask layer, a bottom antireflective coating (BARC) layer, an organic planarization layer (OPL), or a photoresist layer. In some embodiments, the materials for the dielectric layer 380 comprise at least one of Si, O, C, or H, such as SiCOH and SiOC, or other suitable materials. Organic material such as polymers may be used for the dielectric layer 380. In some embodiments, the dielectric layer 380 comprises one or more layers of at least one of a carbon-containing material, organo-silicate glass, a porogen-containing material, or other suitable materials. The dielectric layer 380 comprises nitrogen in some embodiments. In some embodiments, the dielectric layer 380 is formed by at least one of PVD, sputtering, CVD, LPCVD, ALCVD, UHVCVD, RPCVD, ALD, MBE, LPE, spin on, growth, or other suitable techniques. In some embodiments, the dielectric layer 380 comprises a same material composition as the dielectric layer 355 and merges with the dielectric layer 355 at an interface, as indicated by the dashed line 390. The merged dielectric layers 355, 380 are referred to below as a dielectric layer 395 and the dashed line 390 is omitted. In some embodiments, the dielectric layer 380 comprises a different material composition than the dielectric layer 355.

Figure 26:
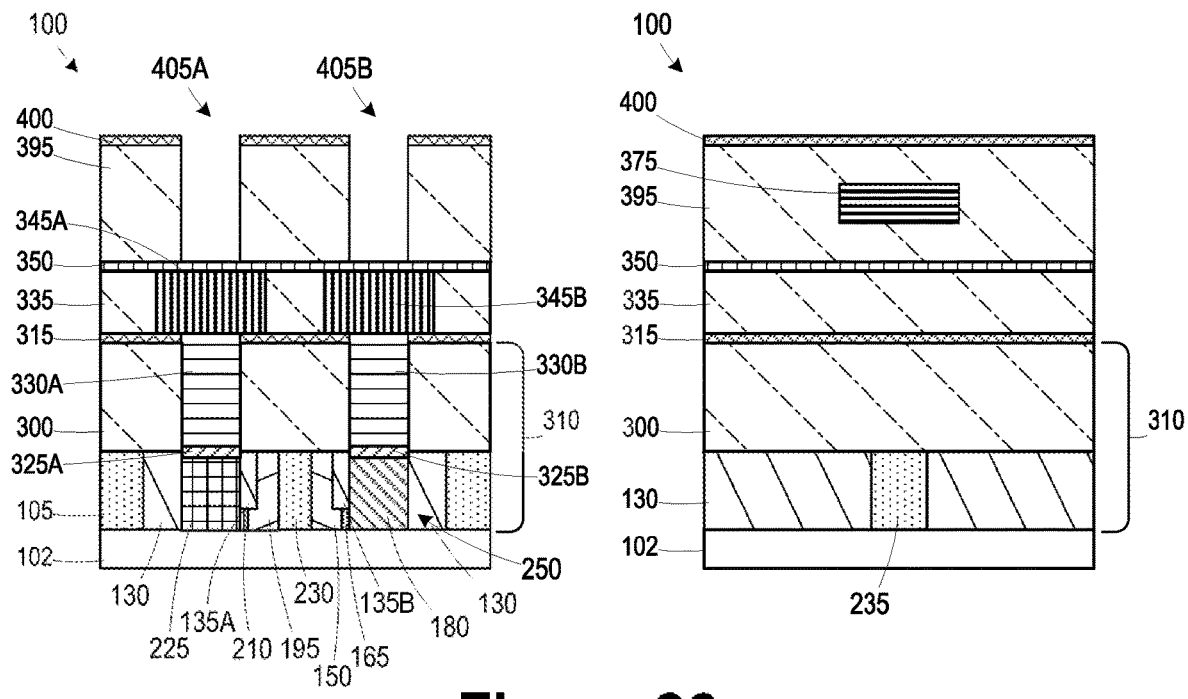

Referring to FIG. 26, the mask layer 385 is patterned to define a mask 400 and an etching processes is performed to pattern the dielectric layer 395 using the mask 400 as an etch template to define via openings 405A, 405B in the dielectric layer 395, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 365 and expose portions of the dielectric layer 355 under the mask 365. The etching process comprises at least one of a plasma etching process, a reactive ion etching (RIE) process, or other suitable techniques. The etch process comprises an anisotropic etch process in accordance with some embodiments.

Figure 27:
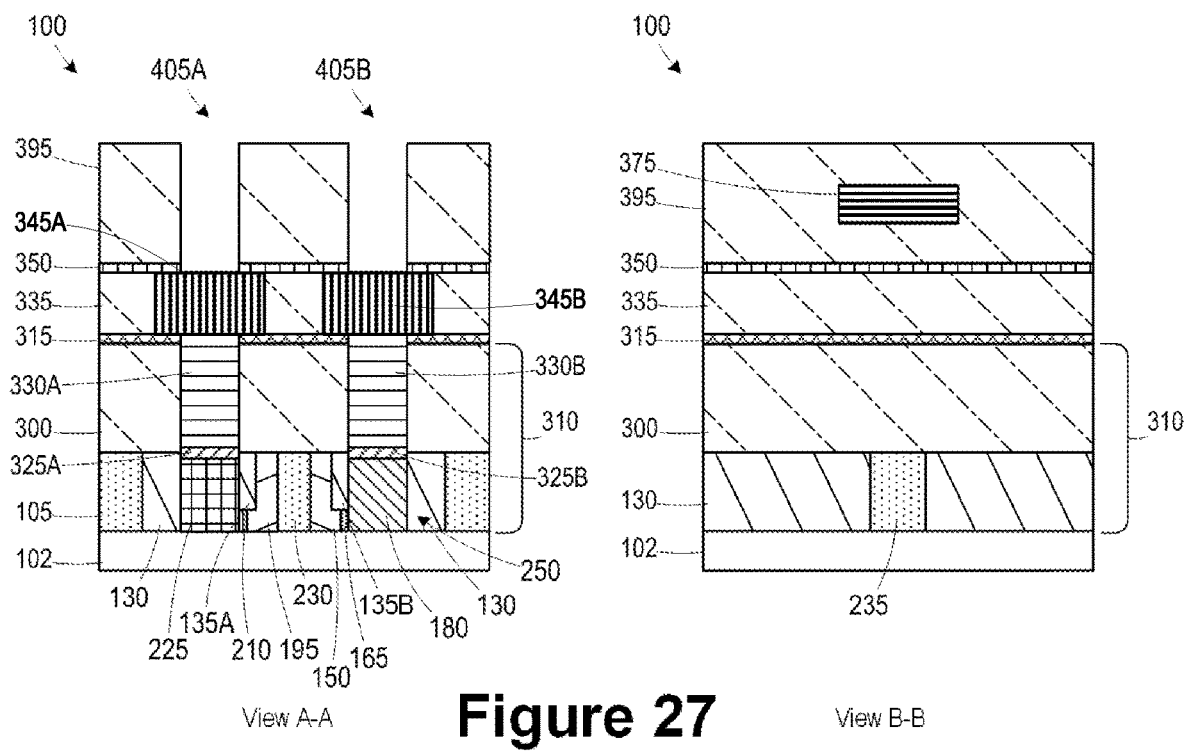

Referring to FIG. 27, the mask 400 and portions of the etch stop layer 350 exposed by the via openings 405A, 405B are removed, in accordance with some embodiments. In some embodiments, an etching process is performed to remove the mask 400 and the portions of the etch stop layer 350 exposed by the via openings 405A, 405B. The etching process comprises at least one of a wet etch process, a plasma etching process, a reactive ion etching (RIE) process, or other suitable techniques. The etch process comprises an anisotropic etch process in accordance with some embodiments.

Figure 28:
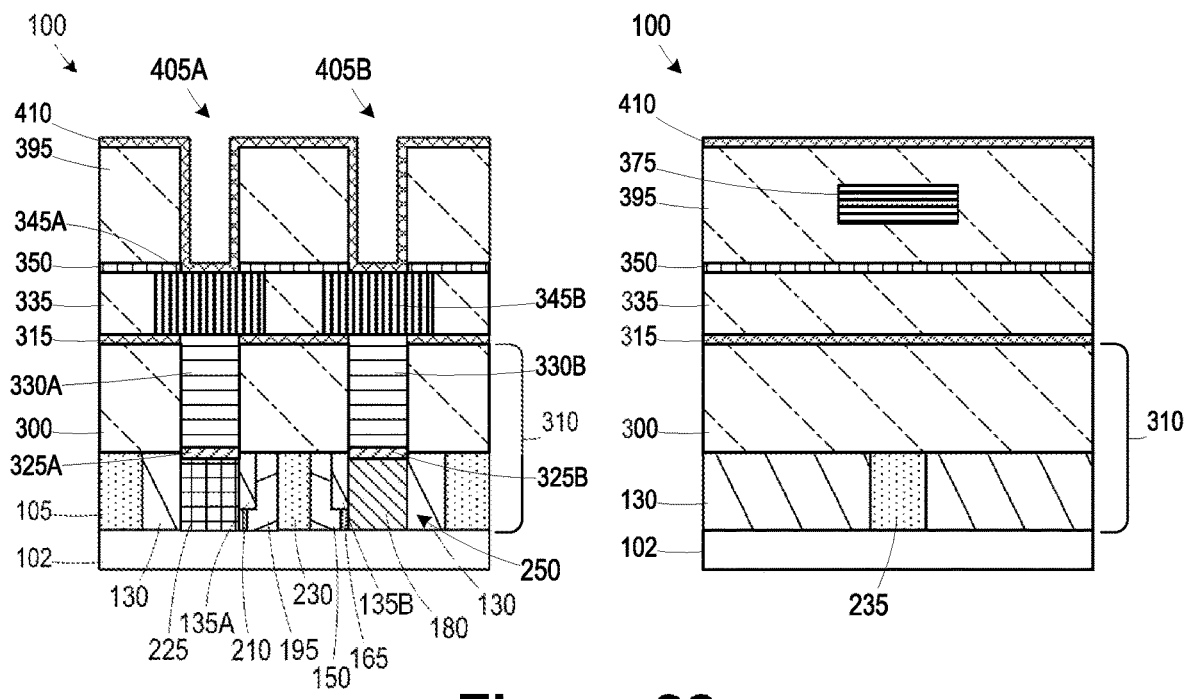

Referring to FIG. 28, a mask layer 410 is formed over the dielectric layer 395 and in the via openings 405A, 405B, in accordance with some embodiments. In some embodiments, the mask layer 410 comprises at least one of a hard mask layer, a bottom antireflective coating (BARC) layer, an organic planarization layer (OPL), or a photoresist layer comprising materials and formed as described herein.

Figure 29:
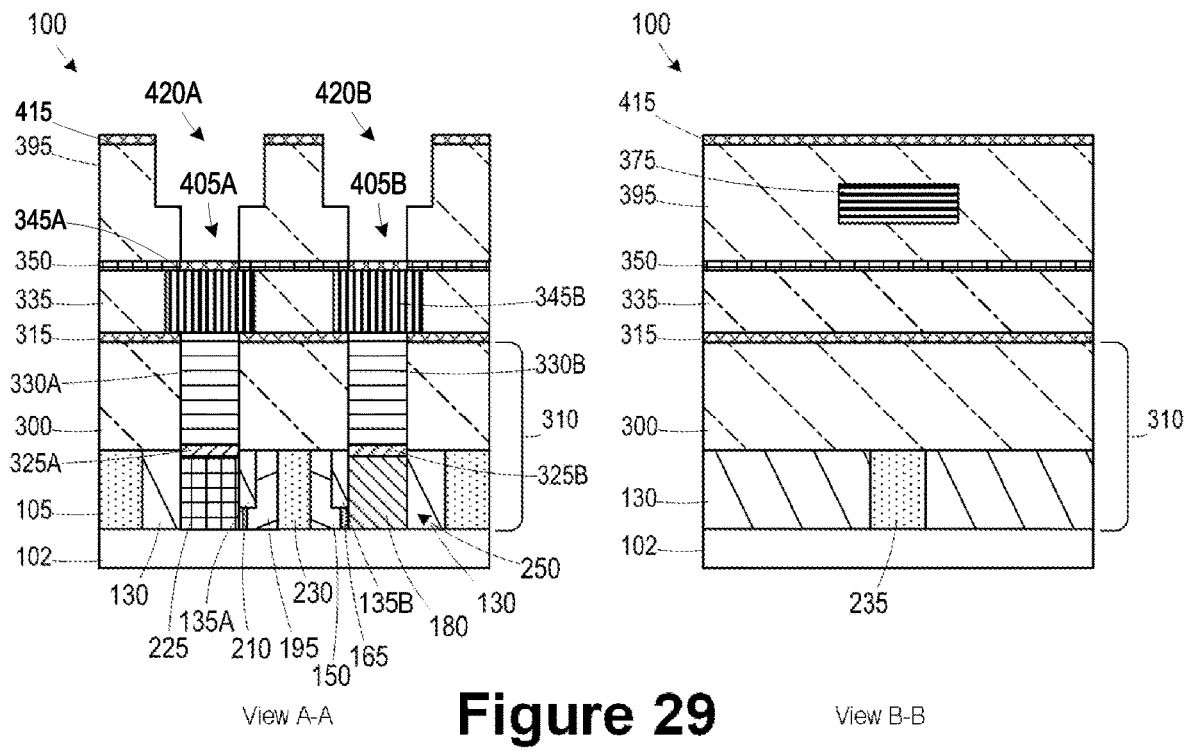

Referring to FIG. 29, the mask layer 410 is patterned to define a mask 415 and an etching processes is performed to pattern the dielectric layer 395 using the mask 415 as an etch template to define trench openings 420A, 420B in the dielectric layer 395, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 415 and expose portions of the dielectric layer 395 under the mask 415. The etching process comprises at least one of a plasma etching process, a reactive ion etching (RIE) process, or other suitable techniques. The etch process comprises an anisotropic etch process in accordance with some embodiments. In some embodiments, a dual damascene process is implemented to form the via openings 405A, 405B and the trench openings 420A, 420B.

Figure 30:
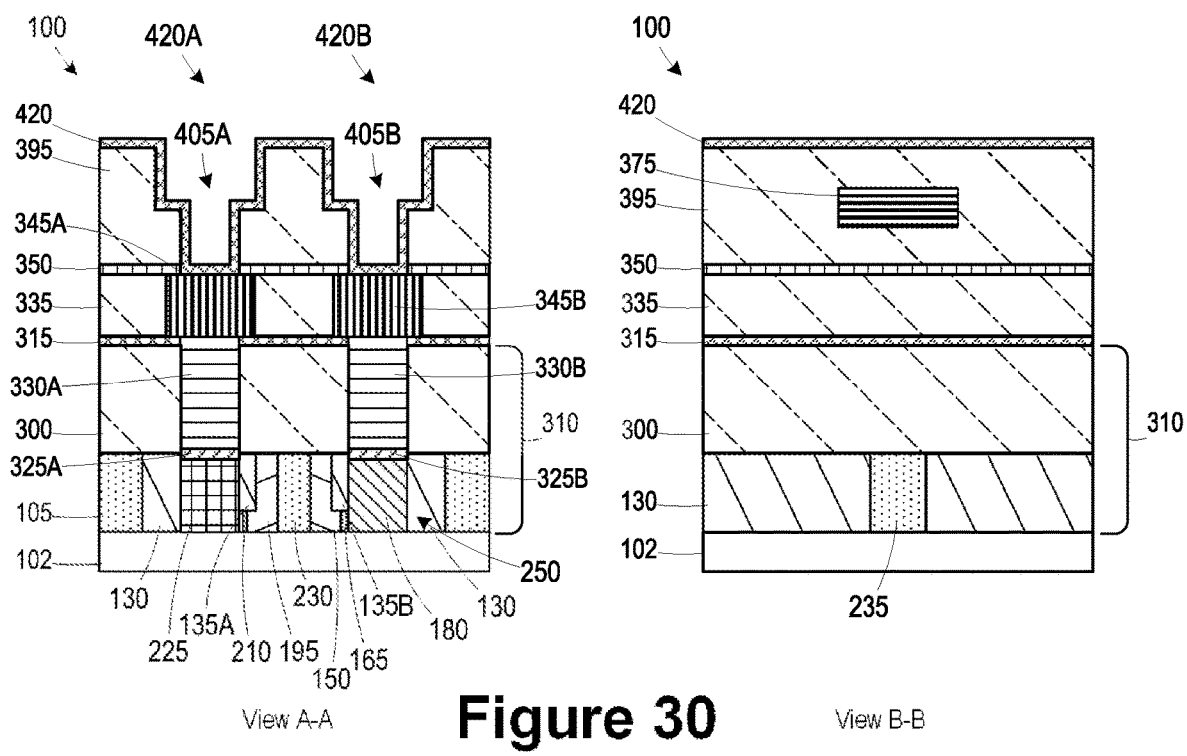

Referring to FIG. 30, the mask 415 is removed and a mask layer 420 is formed over the dielectric layer 395 and in the via openings 405A, 405B and the trench openings 420A, 420B in the dielectric layer 395, in accordance with some embodiments. In some embodiments, the mask layer 420 comprises at least one of a hard mask layer, a bottom antireflective coating (BARC) layer, an organic planarization layer (OPL), or a photoresist layer comprising materials and formed as described herein.

Figure 31:
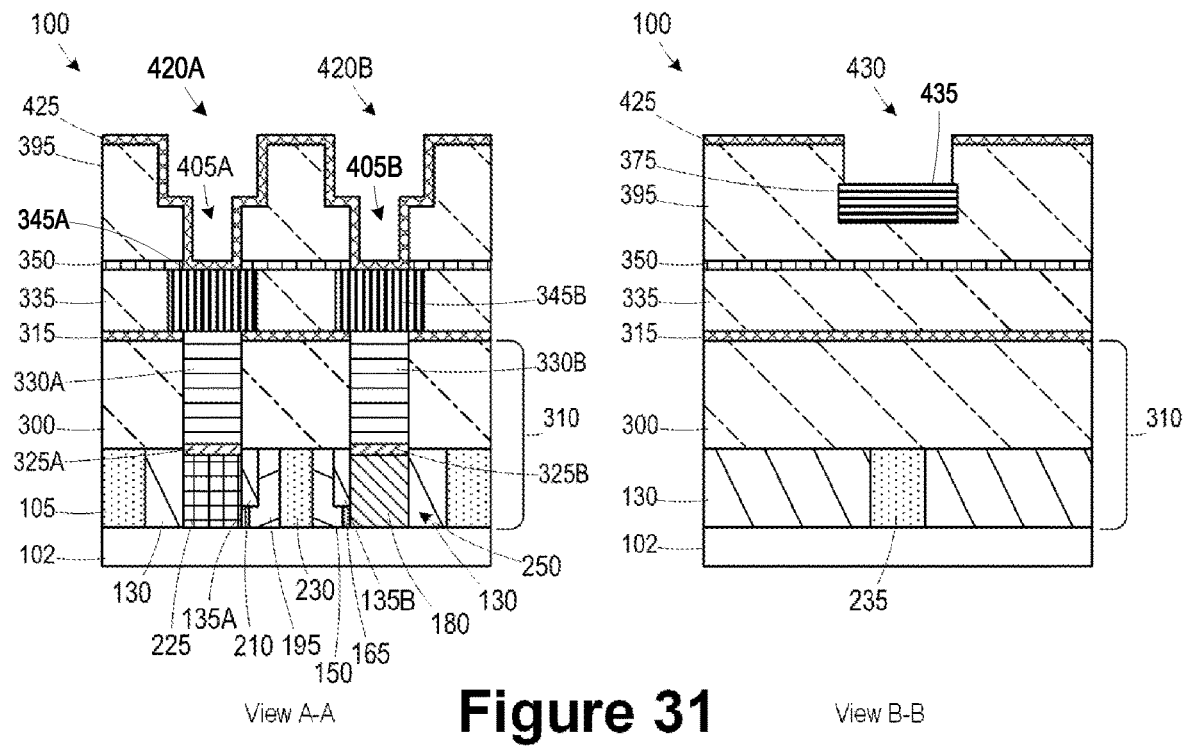

Referring to FIG. 31, the mask layer 420 is patterned to define a mask 425 and an etching processes is performed to pattern the dielectric layer 395 using the mask 425 as an etch template to form a heater line opening 430 in the dielectric layer 395 to expose an uppermost surface 435 of the heater 375, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 425 and expose portions of the dielectric layer 395 under the mask 425. The etching process comprises at least one of a plasma etching process, a reactive ion etching (RIE) process, or other suitable techniques. The etch process comprises an anisotropic etch process in accordance with some embodiments.

Figure 32:
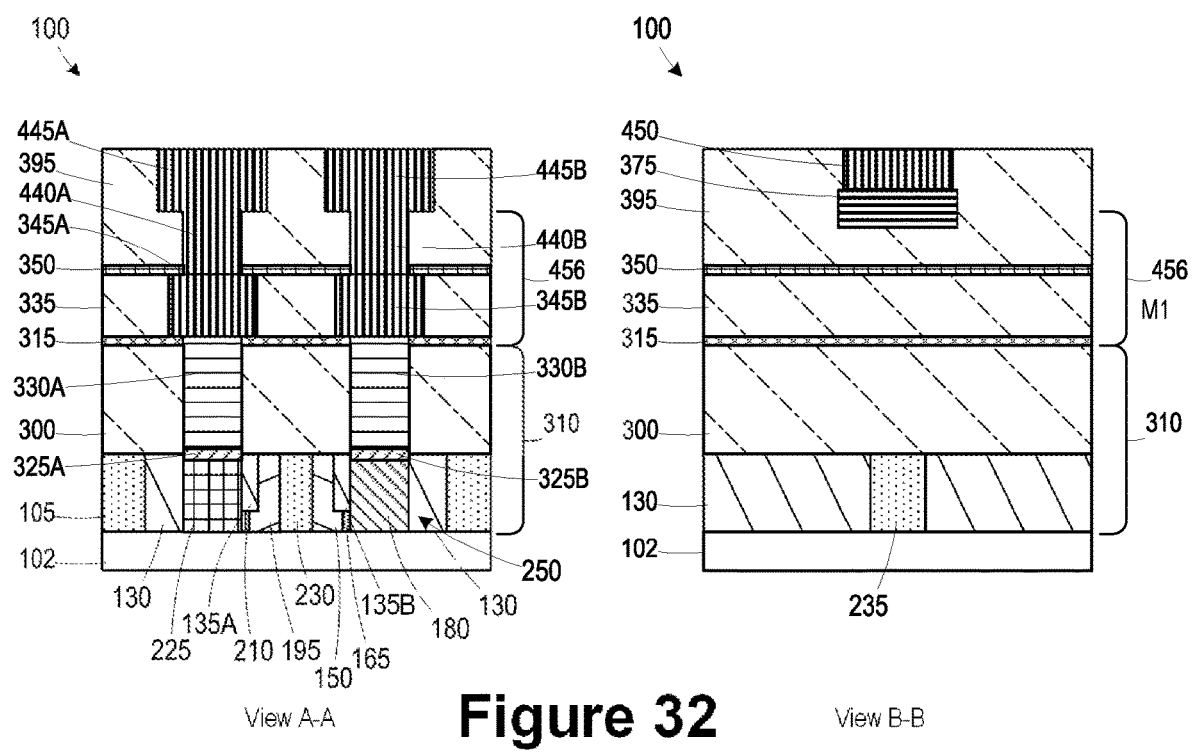

Referring to FIG. 32, the mask 425 is removed and conductive vias 440A, 440B, conductive lines 445A, 445B, and a conductive heater line 450 are formed in the via openings 405A, 405B, the trench openings 420A, 420B, and the heater line opening 430, respectively, in accordance with some embodiments. In some embodiments, the conductive vias 440A, 440B, the conductive lines 445A, 445B, and the conductive heater line 450 are formed by at least one of PVD, sputtering, CVD, LPCVD, ALCVD, UHVCVD, RPCVD, ALD, MBE, LPE, spin on, growth, or other suitable techniques. In some embodiments, at least one of the conductive vias 440A, 440B, the conductive lines 445A, 445B, or the conductive heater line 450 comprises at least one of tungsten, aluminum, copper, cobalt, or other suitable materials. In some embodiments, at least one of the conductive vias 440A, 440B, the conductive lines 445A, 445B, or the conductive heater line 450 comprises a plurality of layers, such as a barrier layer, a seed layer, and a conductive fill layer. In some embodiments, a planarization process, such as chemical mechanical planarization (CMP), is performed to remove material of at least one of the conductive vias 440A, 440B, the conductive lines 445A, 445B, or the conductive heater line 450 extending outside at least one of the via openings 405A, 405B, the trench openings 420A, 420B, or the heater line opening 430.

According to some embodiments, the dielectric layer 335, the conductive lines 345A, 345B, the portion of the dielectric layer 395 adjacent the conductive vias 440A, 440B, and the conductive vias 440A, 440B define a M1 metallization layer 456, referred to as the M1 metallization layer.

Figure 33:
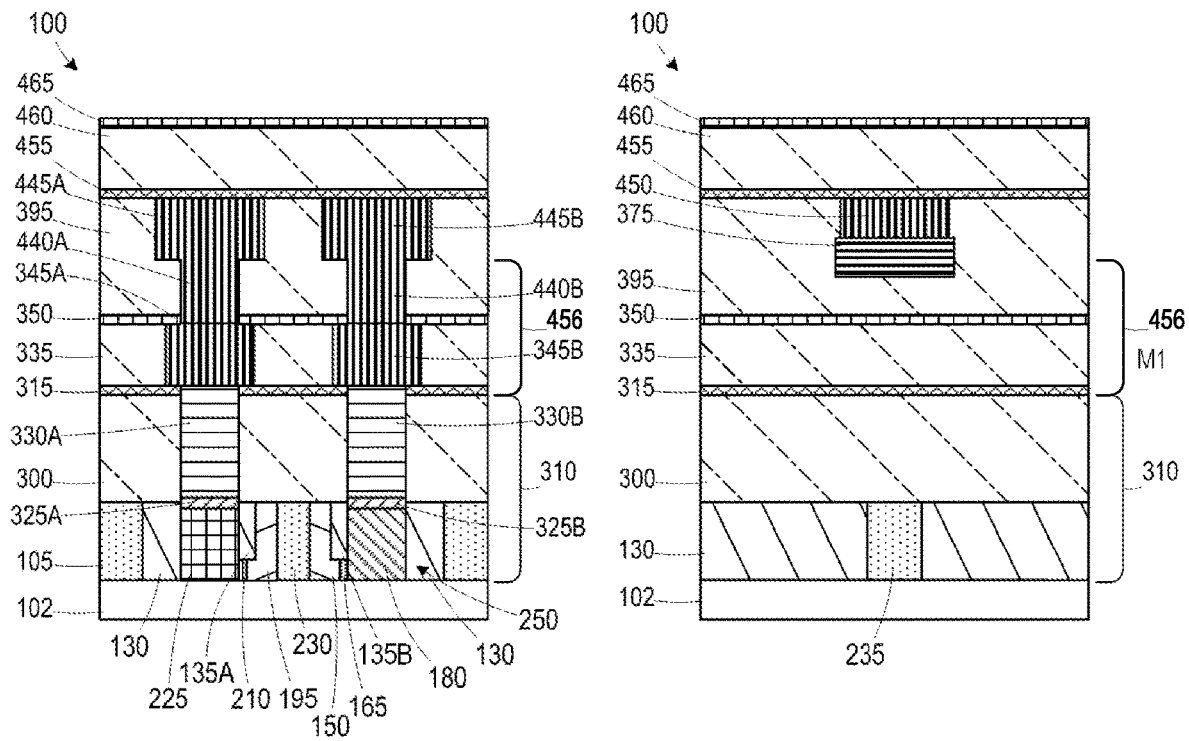

Referring to FIG. 33, an etch stop layer 455, a dielectric layer 460, and a mask layer 465 are formed over, among other things, the dielectric layer 395, in accordance with some embodiments. In some embodiments, the mask layer 465 comprises at least one of a hard mask layer, a bottom antireflective coating (BARC) layer, an organic planarization layer (OPL), or a photoresist layer. In some embodiments, the materials for the dielectric layer 460 comprise at least one of Si, O, C, or H, such as SiCOH and SiOC, or other suitable materials. Organic material such as polymers may be used for the dielectric layer 460. In some embodiments, the dielectric layer 460 comprises one or more layers of at least one of a carbon-containing material, organosilicate glass, a porogen-containing material, or other suitable materials. The dielectric layer 460 comprises nitrogen in some embodiments. In some embodiments, the dielectric layer 460 is formed by at least one of PVD, sputtering, CVD, LPCVD, ALCVD, UHVCVD, RPCVD, ALD, MBE, LPE, spin on, growth, or other suitable techniques. In some embodiments, the etch stop layer 455 comprises a dielectric, such as at least one of an oxide, a nitride, or other suitable materials. In some embodiments, the etch stop layer 455 comprises at least one of Si, Al, Zr, Hf, Y, or other suitable materials. A deposition process, such as CVD, ALD, PVD, spin-on, or other suitable techniques is performed to form the etch stop layer 455. In some embodiments, the dielectric layer 460 comprises a same material composition as the dielectric layer 395. In some embodiments, the dielectric layer 460 comprises a different material composition than the dielectric layer 395. In some embodiments, the etch stop layer 455 is omitted and the material composition of the dielectric layer 460 is selected to have a different etch selectivity relative to the dielectric layer 395.

Figure 34:
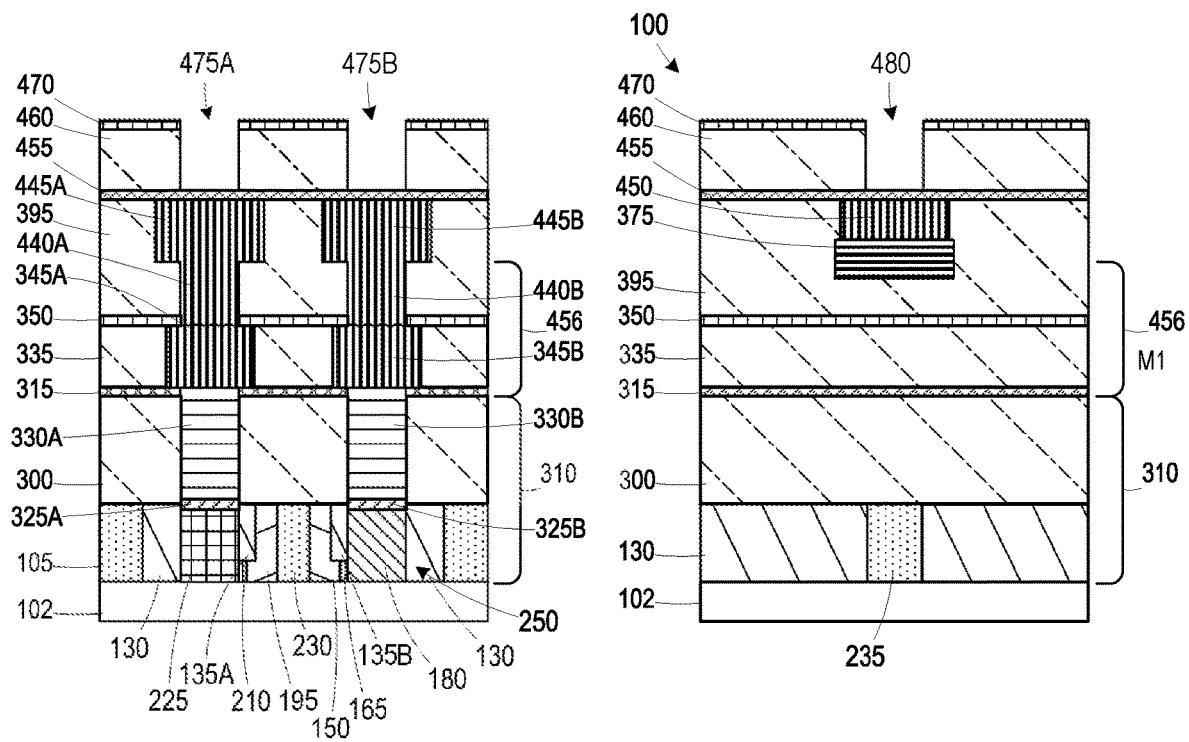

Referring to FIG. 34, the mask layer 465 is patterned to define a mask 470 and an etching processes is performed to pattern the dielectric layer 460 using the mask 465 as an etch template to define via openings 475A, 475B, 480 in the dielectric layer 460, in accordance with some embodiments. The etching of the dielectric layer 460 terminates when the etch stop layer 455 is exposed. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 470 and expose portions of the dielectric layer 460 under the mask 470. The etching process comprises at least one of a plasma etching process, a reactive ion etching (RIE) process, or other suitable techniques. The etch process comprises an anisotropic etch process in accordance with some embodiments.

Figure 35:
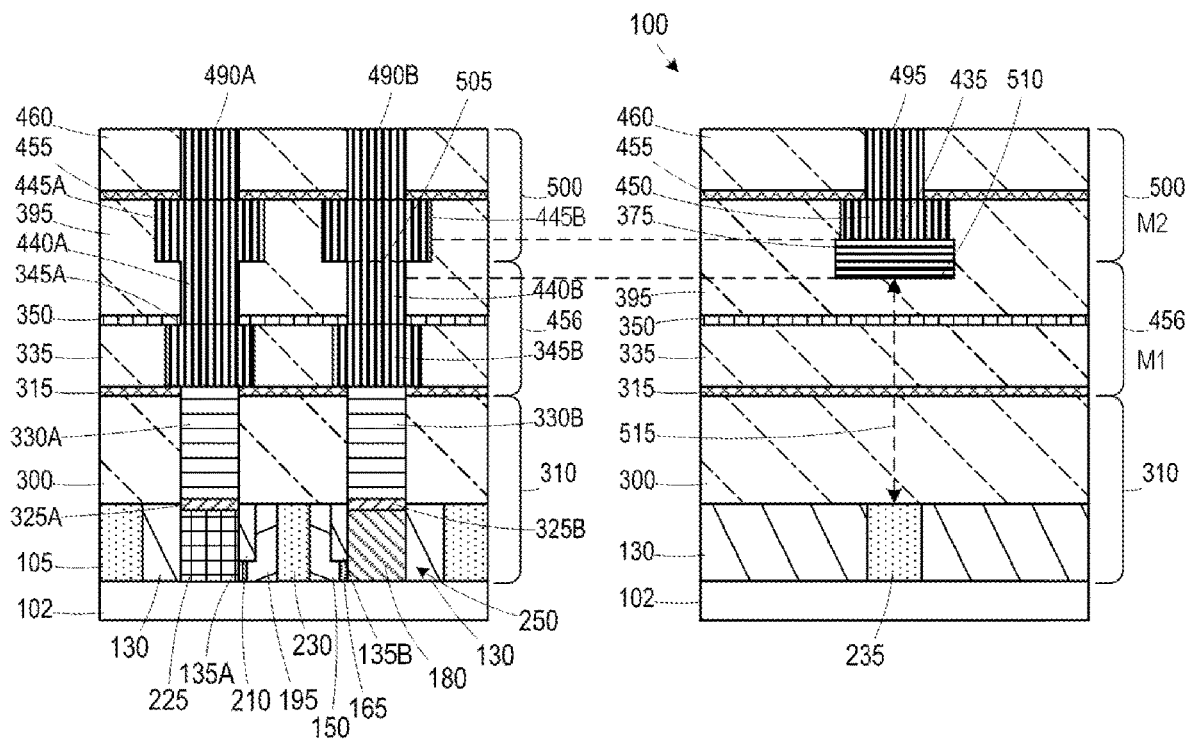

Referring to FIG. 35, portions of the etch stop layer 455 exposed by the via openings 475A, 475B, 480 are removed, conductive vias 490A, 490B, 495 are formed in the via openings 475A, 475B, 480, and the mask 470 is removed, in accordance with some embodiments. In some embodiments, the conductive vias 490A, 490B, 495 are formed by at least one of PVD, sputtering, CVD, LPCVD, ALCVD, UHVCVD, RPCVD, ALD, MBE, LPE, spin on, growth, or other suitable techniques. In some embodiments, at least one of the conductive vias 490A, 490B, 495 comprises tungsten, aluminum, copper, cobalt, or other suitable materials. In some embodiments, at least one of the conductive vias 490A, 490B, 495 comprises a plurality of layers, such as a barrier layer, a seed layer, and a conductive fill layer. In some embodiments, a planarization process, such as CMP, is performed to remove material of the conductive vias 490A, 490B, 495 extending outside the via openings 475A, 475B, 480. In some embodiments, the planarization process removes the mask 470.

According to some embodiments, the portion of the dielectric layer 395 adjacent the conductive lines 445A, 445B and the conductive heater line 450, the conductive lines 445A, 445B, the conductive heater line 450, the dielectric layer 460, and the conductive vias 490A, 490B, 495 define a M2 metallization layer 500, referred to as the M2 metallization layer.

According to some embodiments, the heater 375 is positioned partially in the M1 metallization layer 456 and partially in the M2 metallization layer 500. The uppermost surface 435 of the heater 375 is positioned above an interface 505 between the M1 conductive vias 440A, 440B and the M2 conductive lines 445A, 445B. A lowermost surface 510 of the heater 375 is positioned below the interface 505. The positioning of the heater 375 defines a vertical spacing 515 between the heater 375 and the optical device 250.

In the view of FIG. 35, the heater 375 extends in the Z-direction, such as into and out of the page. In some embodiments, at least one of the shape and/or dimension(s) of the heater 375 reflect the shape and/or dimension(s) of the optical device 250 which is to be heated by the heater 375. For example, as shown in FIG. 12, the waveguide 235 has a generally rectangular shape. Hence, the heater 375 has a similar shape extending in the Z-direction.

The vertical spacing 515 between the heater 375 and the optical device affects thermal efficiency and can affect the operation of the optical device 250. For example, if the vertical spacing 515 is too small, the heater 375 can absorb evanescent light of the silicon in the optical device 250 and cause optical density loss, reducing the performance of the optical device 250. If the vertical spacing 515 is too large, the optical loss is mitigated, but the thermal efficiency of the heater 375 is reduced due to reduced heat transfer. The material composition and thickness of the heater 375, defined by the distance between the uppermost surface 435 and the lowermost surface 510, affects the thermal capacity of the heater 375. As described below, the heater 375 should have the capacity to tune the optical device 250 across at least one free spectral range (FSR) of phase shift. Process and footprint constraints associated with the M1 metallization layer 456 and the M2 metallization layer 500 can affect the allowable range of vertical spacing and heater thickness.

In some embodiments, a value for the vertical spacing 515 that provides acceptable loss and thermal performance is around 600 nm. In some embodiments, for materials such as TiN, TaN, and/or W for the heater 375, a thickness value of around 150 nm provides sufficient thermal capacity. In some embodiments, the power domain for powering the heater 375 is around 2.5V. Providing the heater 375 in the M1 metallization layer 456 and the M2 metallization layer 500 avoids affecting the M2/Vial height associated with the M1 conductive vias 440A, 440B and the M2 conductive lines 445A, 445B to comply with associated aspect ratio constraints.

FIGS. 36-39 illustrate the semiconductor arrangement 100 at various stages of fabrication during the formation of metallization layers and a heater 635 over the optical device 250, in accordance with some embodiments. FIGS. 36-39 illustrate cross-sectional views of embodiments of the semiconductor arrangement 100. The fabrication illustrated in FIG. 36 starts with the semiconductor arrangement 100 illustrated in FIG. 21 after formation of the M1 conductive lines 345A, 345B.

Figure 36:
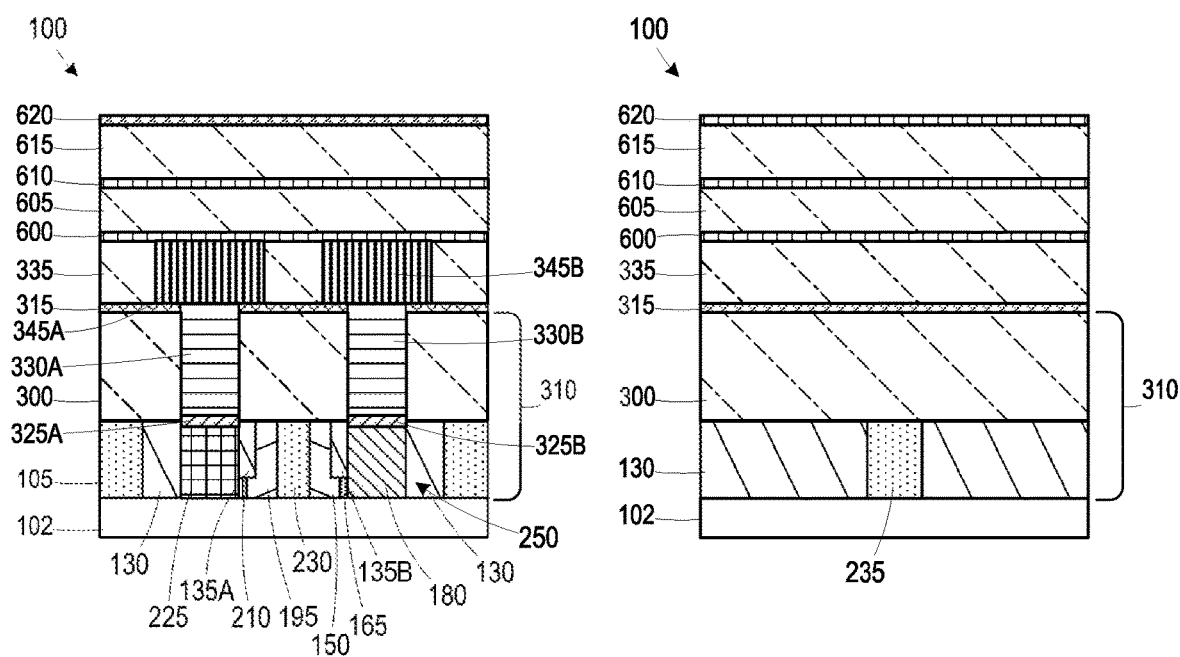
FIGS. 36-39 illustrate cross-sectional views of a semiconductor arrangement at various stages of fabrication, in accordance with some embodiments.

Referring to FIG. 36, a first etch stop layer 600, a first dielectric layer 605, a second etch stop layer 610, a second dielectric layer 615, and a mask layer 620 are formed over the dielectric layer 335, in accordance with some embodiments. In some embodiments, the mask layer 620 comprises at least one of a hard mask layer, a bottom antireflective coating (BARC) layer, an organic planarization layer (OPL), or a photoresist layer. In some embodiments, the materials for the first dielectric layer 605 and/or the second dielectric layer 615 comprise at least one of Si, O, C, or H, such as SiCOH and SiOC, or other suitable materials. Organic material such as polymers may be used for the first dielectric layer 605 and/or the second dielectric layer 615. In some embodiments, the first dielectric layer 605 and/or the second dielectric layer 615 comprises one or more layers of at least one of a carbon-containing material, organo-silicate glass, a porogen-containing material, or other suitable materials. The first dielectric layer 605 and/or the second dielectric layer 615 comprises nitrogen in some embodiments. In some embodiments, the first dielectric layer 605 and/or the second dielectric layer 615 are formed by at least one of PVD, sputtering, CVD, LPCVD, ALCVD, UHVCVD, RPCVD, ALD, MBE, LPE, spin on, growth, or other suitable techniques. In some embodiments, the first etch stop layer 600 and/or the second etch stop layer 610 comprises a dielectric, such as at least one of an oxide, a nitride, or other suitable materials. In some embodiments, the first etch stop layer 600 and the second etch stop layer 610 each comprises at least one of Si, Al, Zr, Hf, Y, or other suitable materials. Deposition processes, such as CVD, ALD, PVD, spin-on, or other suitable techniques are performed to form the first etch stop layer 600 and the second etch stop layer 610. In some embodiments, the first etch stop layer 600 comprises a same material composition as the second etch stop layer 610. In some embodiments, the first dielectric layer 605 comprises a same material composition as the second dielectric layer 615 and/or the dielectric layer 335. In some embodiments, the first dielectric layer 605 comprises a different material composition than the second dielectric layer 615 and/or the dielectric layer 335. In some embodiments, the first etch stop layer 600 is omitted and the material composition of the first dielectric layer 605 is selected to have a different etch selectivity relative to the dielectric layer 335.

Figure 37:
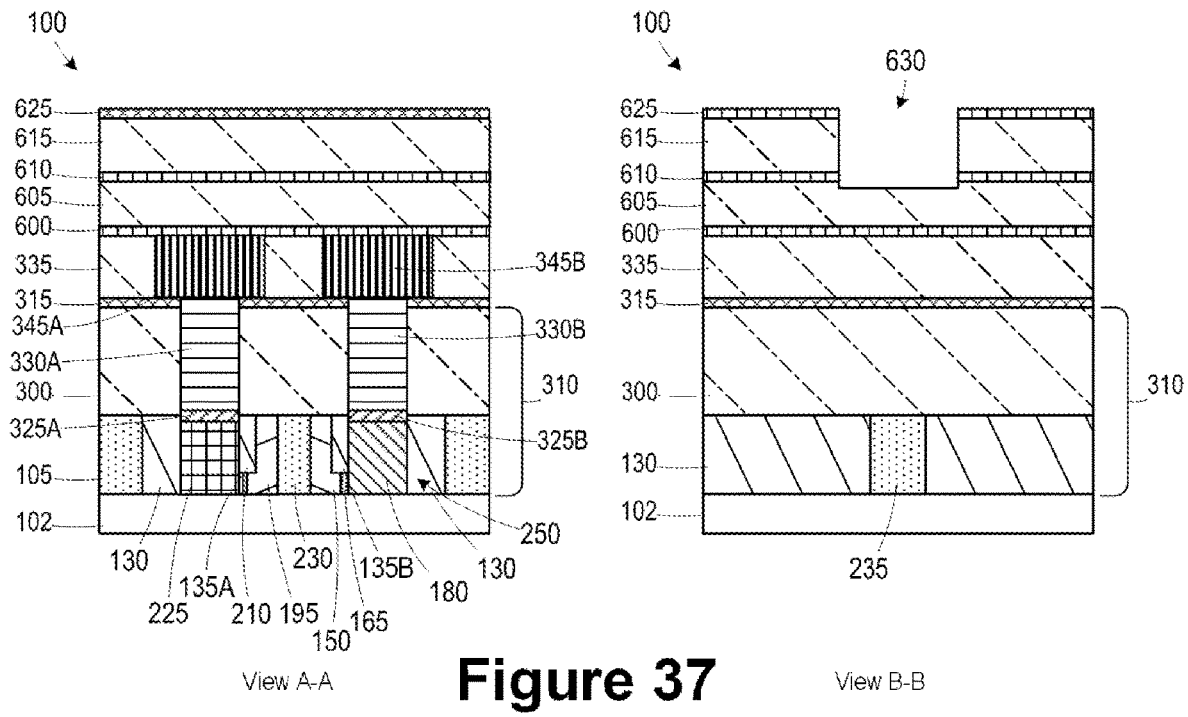

Referring to FIG. 37, the mask layer 620 is patterned to define a mask 625 and an etching processes is performed to pattern the first dielectric layer 605, the second etch stop layer 610, and the second dielectric layer 615 using the mask 625 as an etch template to define a heater recess 630 in the first dielectric layer 605, the second etch stop layer 610, and the second dielectric layer 615, in accordance with some embodiments. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 625 and expose portions of the second dielectric layer 615 under the mask 625. The etching process comprises at least one of a plasma etching process, a reactive ion etching (RIE) process, or other suitable techniques. The etch process comprises an anisotropic etch process in accordance with some embodiments.

Figure 38:
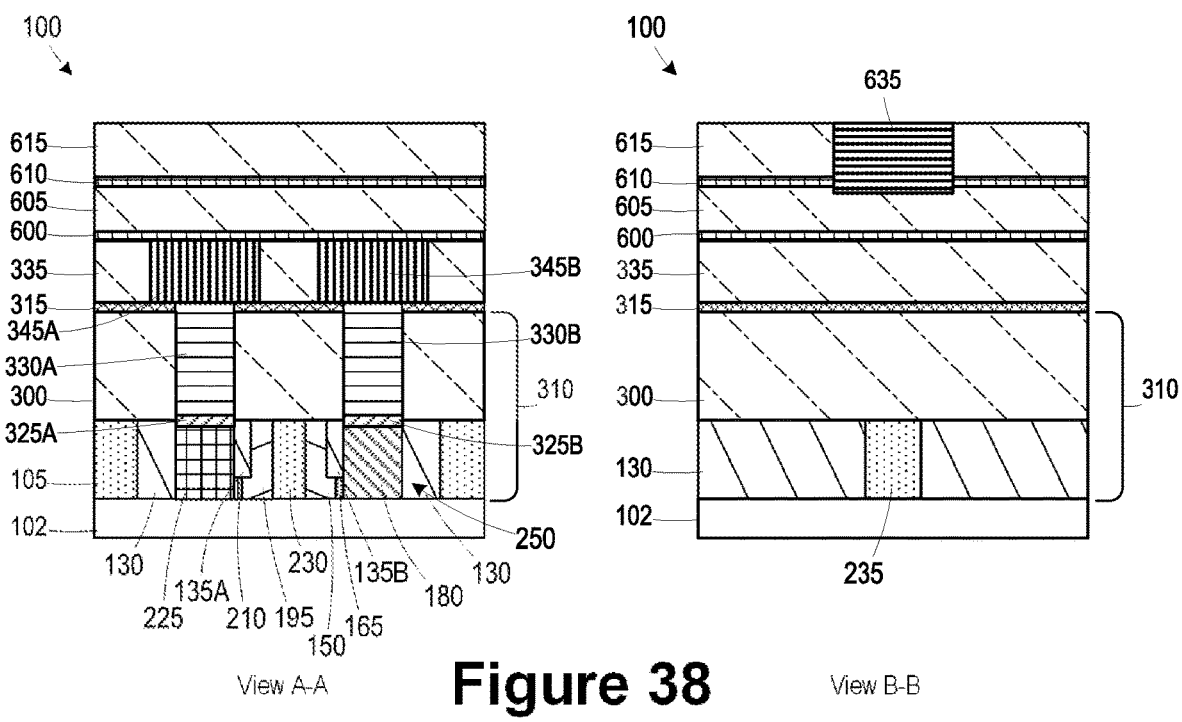

Referring to FIG. 38, the mask 625 is removed and a heater 635 is formed in the heater recess 630, in accordance with some embodiments. In some embodiments, the heater 635 is formed by at least one of PVD, sputtering, CVD, LPCVD, ALCVD, UHVCVD, RPCVD, ALD, MBE, LPE, spin on, growth, or other suitable techniques. In some embodiments, the heater 635 comprises at least one of tungsten, aluminum, copper, cobalt, or other suitable materials. In some embodiments, the heater 635 comprises a plurality of layers, such as a barrier layer, a seed layer, and a conductive fill layer. In some embodiments, the heater 635 comprises a same material as at least one of the conductive lines 345A, 345B. In some embodiments, the heater 635 comprises a different material than at least one of the conductive lines 345A, 345B. In some embodiments, a planarization process, such as CMP, is performed to remove material of the heater 635 extending outside the heater recess 630. In some embodiments, the planarization process removes the mask 625.

Figure 39:
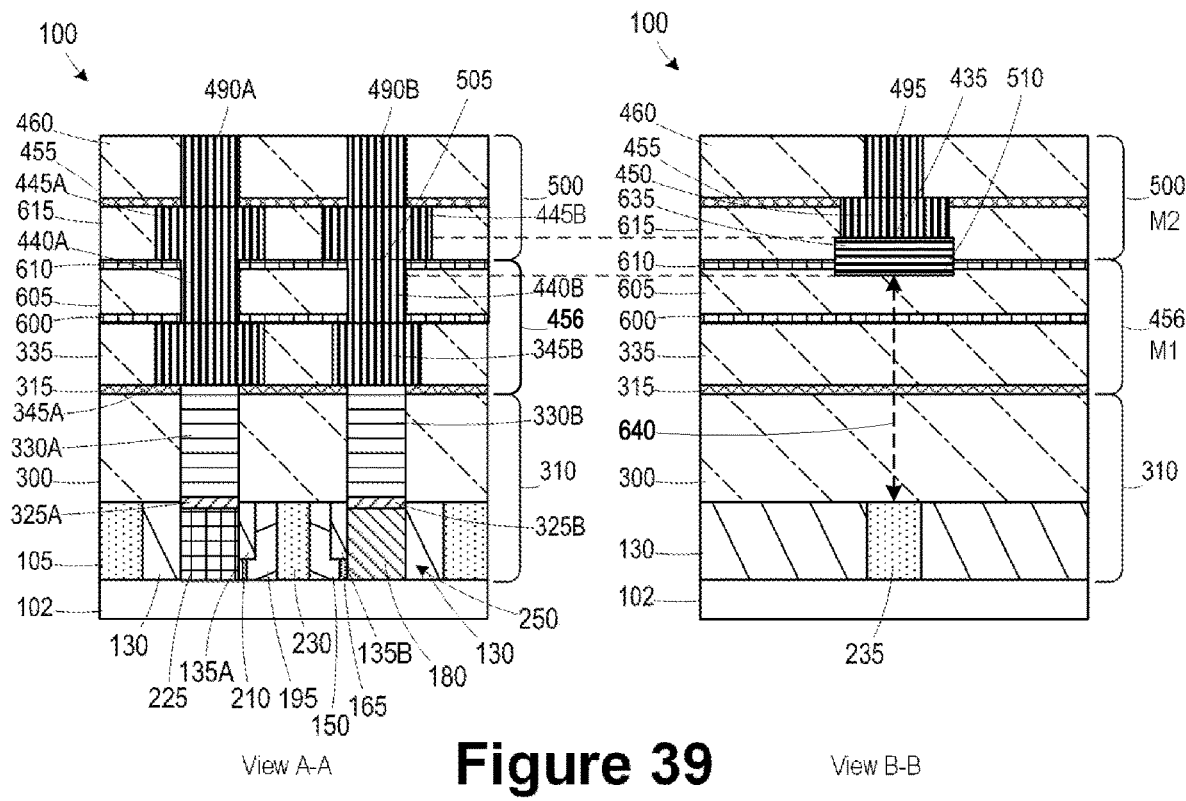

Referring to FIG. 39, the processes described in reference to FIGS. 25-35 are performed to complete the M1 metallization layer 456 and the M2 metallization layer 500, in accordance with some embodiments. During the etching process described in reference to FIG. 29 to define the trench openings 420A, 420B in the second dielectric layer 615, the etching process is terminated when the second etch stop layer 610 is exposed.

According to some embodiments, the heater 635 is positioned partially in the M1 metallization layer 456 and partially in the M2 metallization layer 500. The uppermost surface 435 of the heater 635 is positioned above the interface 505 between the M1 conductive vias 440A, 440B and the M2 conductive lines 445A, 445B. The lowermost surface 510 of the heater 635 is positioned below the interface 505.

The positioning of the heater 635 defines a vertical spacing 640 between the heater 635 and the optical device 250. In some embodiments, a value for the vertical spacing 640 that provides acceptable loss and thermal performance is around 600 nm. In some embodiments, for materials such as TiN, TaN, and/or W for the heater 635, a thickness value of around 150 nm provides sufficient thermal capacity. In some embodiments, the power domain for powering the heater 635 is around 2.5V. Providing the heater 635 in the M1 metallization layer 456 and the M2 metallization layer 500 avoids affecting the M2/Vial height associated with the M1 conductive vias 440A, 440B and the M2 conductive lines 445A, 445B to comply with associated aspect ratio constraints.

Figure 40:
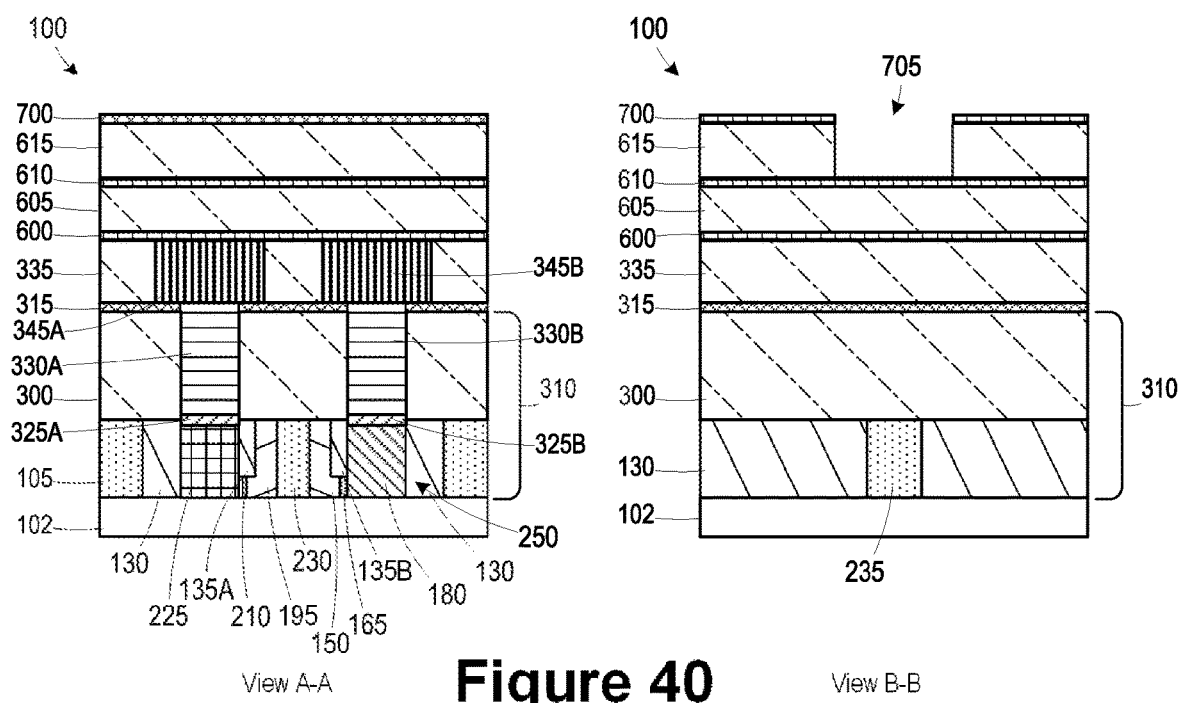
FIGS. 40-44 illustrate cross-sectional views of a semiconductor arrangement at various stages of fabrication, in accordance with some embodiments.
Figure 41:
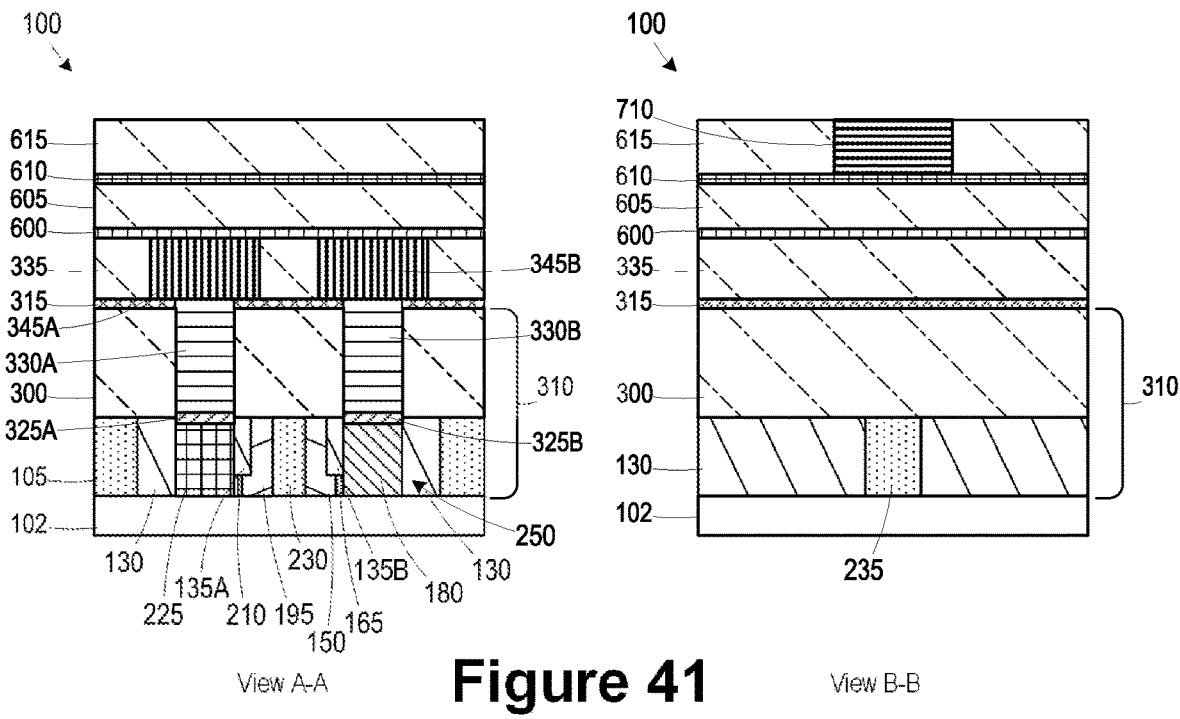
Figure 42:
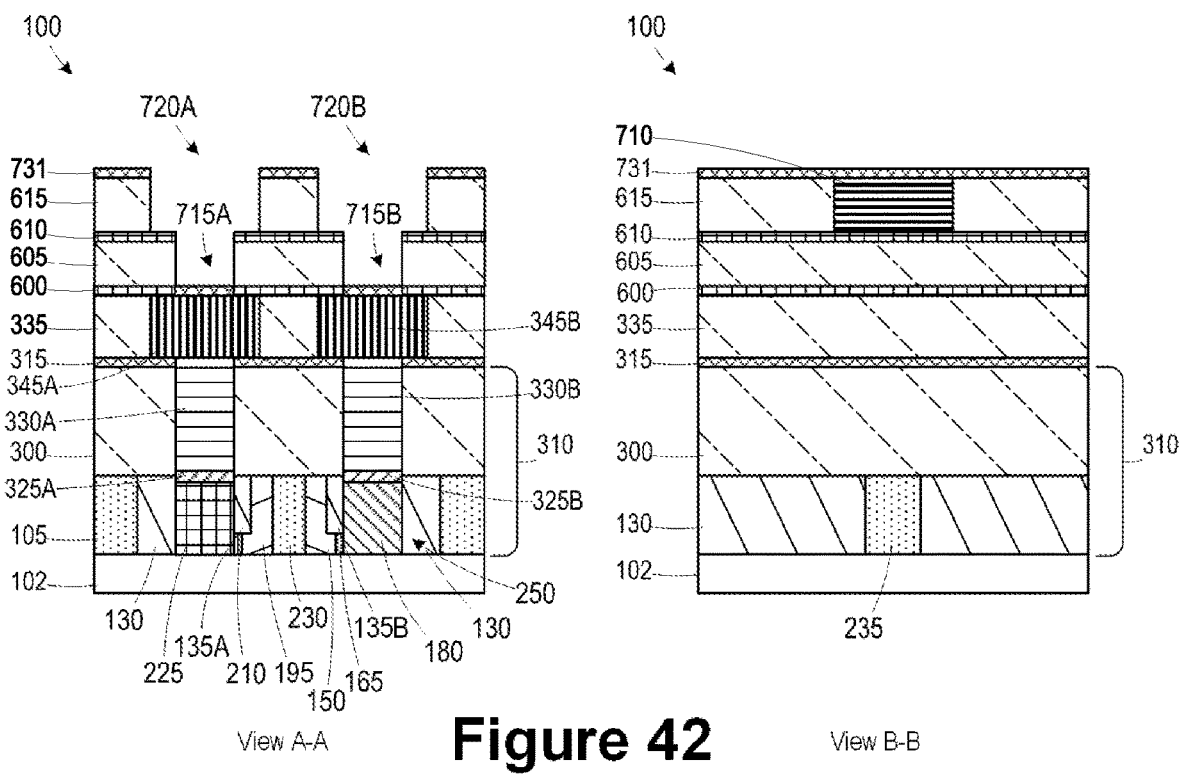

FIGS. 40-44 illustrate the semiconductor arrangement 100 at various stages of fabrication during the formation of metallization layers and a heater 710 over the optical device 250, in accordance with some embodiments. FIGS. 40-42 illustrate cross-sectional views of embodiments of the semiconductor arrangement 100. The fabrication illustrated in FIG. 40 starts with the semiconductor arrangement 100 illustrated in FIG. 36 after formation of the mask layer 620.

Referring to FIG. 40, the mask layer 620 is patterned to define a mask 700 and an etching processes is performed to pattern the first dielectric layer 605, the second etch stop layer 610, and the second dielectric layer 615 using the mask 700 as an etch template to define a heater recess 705 in the second dielectric layer 615, in accordance with some embodiments. The etching process is terminated when the second etch stop layer 610 is exposed. In some embodiments, the photoresist layer is exposed using a radiation source and a reticle to define a pattern in the photoresist layer and portions of the photoresist layer are removed to define a patterned photoresist layer. The underlying OPL, BARC layer, and hard mask layer are etched using the patterned photoresist layer as a template to form the mask 700 and expose portions of the second dielectric layer 615 under the mask 700. The etching process comprises at least one of a plasma etching process, a reactive ion etching (RIE) process, or other suitable techniques. The etch process comprises an anisotropic etch process in accordance with some embodiments.

Referring to FIG. 41, the mask 700 is removed and a heater 710 is formed in the heater recess 705, in accordance with some embodiments. In some embodiments, the heater 710 is formed by at least one of PVD, sputtering, CVD, LPCVD, ALCVD, UHVCVD, RPCVD, ALD, MBE, LPE, spin on, growth, or other suitable techniques. In some embodiments, the heater 710 comprises at least one of tungsten, aluminum, copper, cobalt, or other suitable materials. In some embodiments, the heater 710 comprises a plurality of layers, such as a barrier layer, a seed layer, and a conductive fill layer. In some embodiments, the heater 710 comprises a same material as at least one of the conductive lines 345A, 345B. In some embodiments, the heater 710 comprises a different material than at least one of the conductive lines 345A, 345B. In some embodiments, a planarization process, such as CMP, is performed to remove material of the heater 710 extending outside the heater recess 705. In some embodiments, the planarization process removes the mask 700.

Referring to FIG. 42, the processes described in reference to FIGS. 25-29 are performed to form via openings 715A, 715B in the first dielectric layer 605, form a mask 731, and form and trench openings 720A, 720B in the second dielectric layer 615 using the mask 731 as an etch template, in accordance with some embodiments. During the etching process described in reference to FIG. 29 to define the trench openings 720A, 720B in the second dielectric layer 615, the etching process is terminated when the second etch stop layer 610 is exposed. In some embodiments, a dual damascene process is implemented to form the via openings 715A, 715B and the trench openings 720A, 720B.

Figure 43:
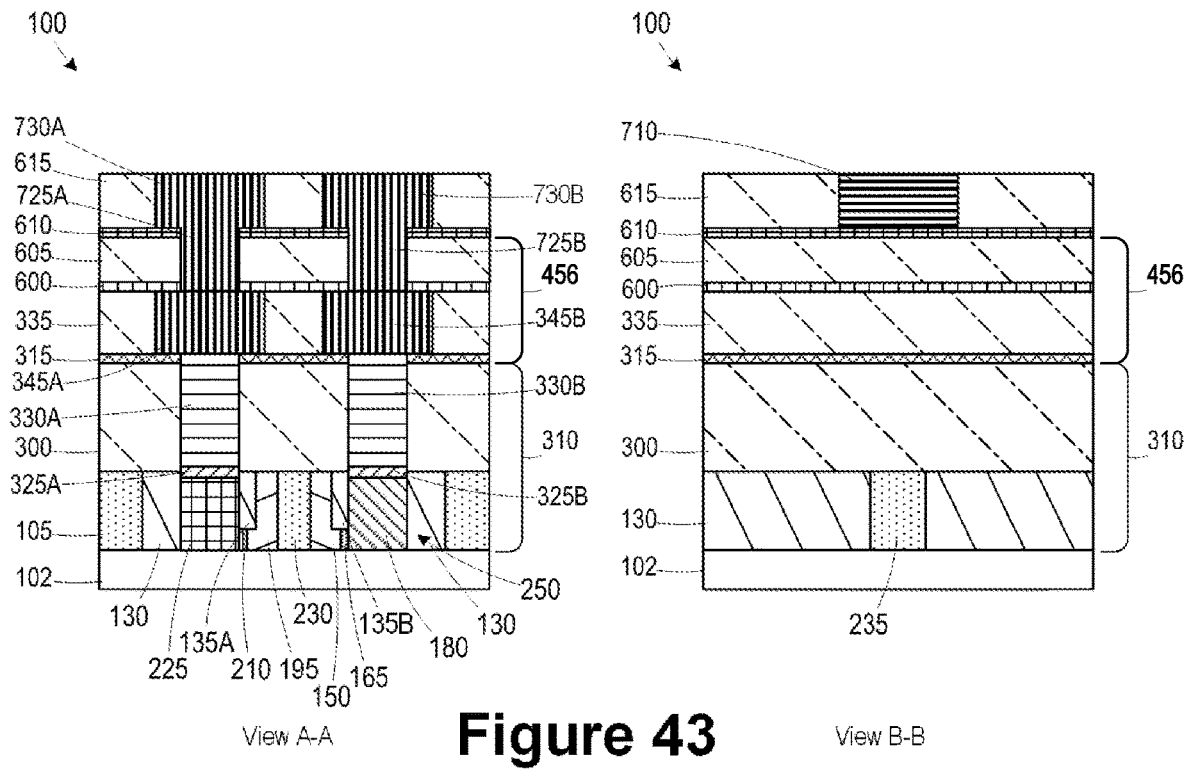

Referring to FIG. 43, the mask 731 is removed and conductive vias 725A, 725B and conductive lines 730A, 730B are formed in the via openings 715A, 715B and the trench openings 720A, 720B, respectively, in accordance with some embodiments. In some embodiments, the conductive vias 725A, 725B and the conductive lines 730A, 730B are formed by at least one of PVD, sputtering, CVD, LPCVD, ALCVD, UHVCVD, RPCVD, ALD, MBE, LPE, spin on, growth, or other suitable techniques. In some embodiments, at least one of the conductive vias 725A, 725B of the conductive lines 730A, 730B comprises at least one of tungsten, aluminum, copper, cobalt, or other suitable materials. In some embodiments, at least one of the conductive vias 725A, 725B or the conductive lines 730A, 730B comprises a plurality of layers, such as a barrier layer, a seed layer, and a conductive fill layer. In some embodiments, a planarization process, such as chemical mechanical planarization (CMP), is performed to remove material of at least one of the conductive vias 725A, 725B of the conductive lines 730A, 730B extending outside at least one of the via openings 715A, 715B or the trench openings 720A, 720B.

Figure 44:
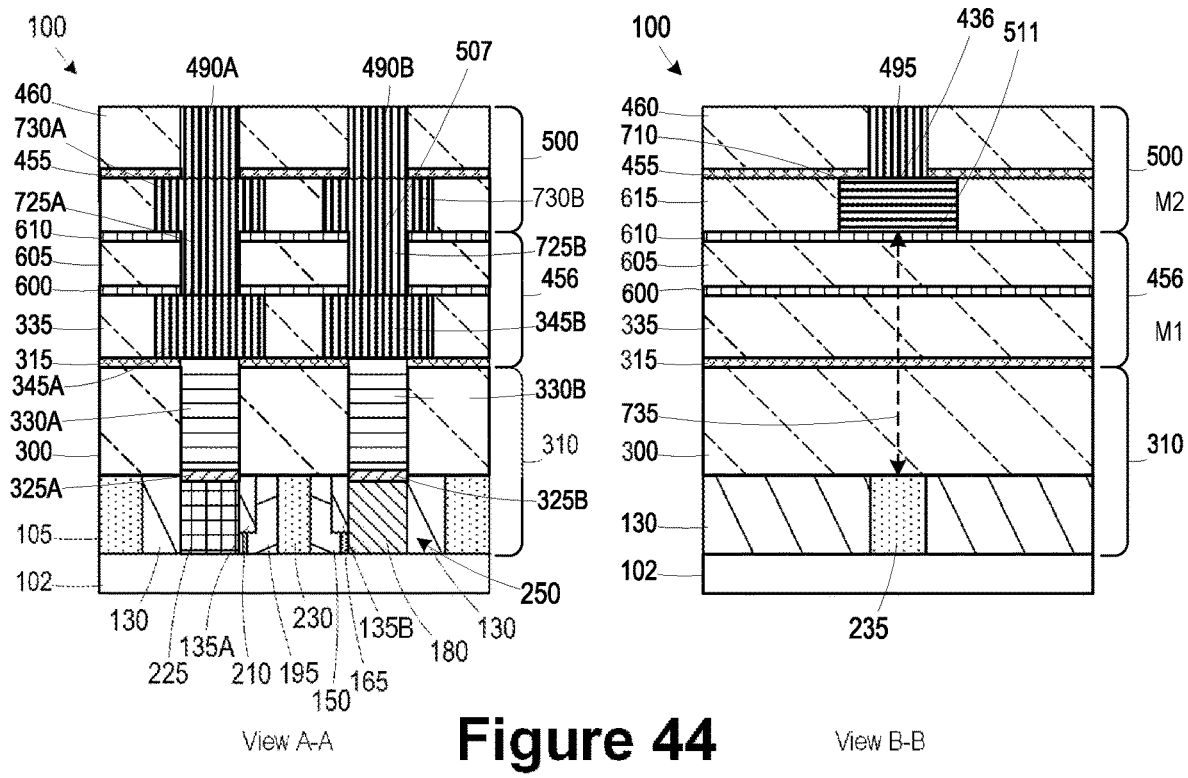

Referring to FIG. 44, the processes described in reference to FIGS. 33-35 are performed to complete the M2 metallization layer 500, in accordance with some embodiments. The heater 710 is provided in the M2 metallization layer 500. According to some embodiments, a lowermost surface 511 of the heater 710 is not below an interface 507 between the between the M1 conductive vias 725A, 725B and the M2 conductive lines 730A, 730B, and an uppermost surface 436 of the heater 710 is above the interface 507.

The positioning of the heater 710 defines a vertical spacing 735 between the heater 375 and the optical device 250. In some embodiments, a value for the vertical spacing 735 is around 680 nm. In some embodiments, for materials such as TiN, TaN, and/or W for the heater 710, a thickness value of around 220 nm provides sufficient thermal capacity and compensates for the increased vertical spacing 735. In some embodiments, the power domain for powering the heater 375 is around 2.5V. Providing the heater 710 in the line portion of the M2 metallization layer 500 avoids affecting the M2/Vial height associated with the M1 conductive vias 440A, 440B and the M2 conductive lines 445A, 445B to comply with associated aspect ratio constraints.

In some embodiments, at least one of the shape and/or dimension(s) of the heater 375, 635, 710 reflect the shape and/or dimension(s) of the optical device which is to be heated by the heater 375, 635, 710.

Figure 45:
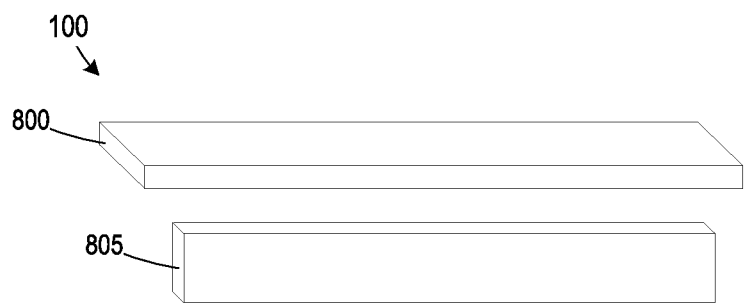
FIGS. 45-47 illustrate various configurations of semiconductor arrangements, in accordance with some embodiments.

Referring to FIG. 45, the semiconductor arrangement 100 includes a rectangular optical device 800 formed in the device layer 310, and a corresponding rectangular heater 805 formed above the rectangular optical device 800, according to some embodiments. As described above, the rectangular heater 805 is formed in the M1 metallization layer 456 and/or the M2 metallization layer 500. For ease of illustration, the layers surrounding the rectangular optical device 800 and the rectangular heater 805 are omitted. The rectangular optical device 800 is a waveguide, and the rectangular heater 805 is bar or plate shaped, according to some embodiments. The rectangular optical device 800 may be an active optical device or a passive optical device.

Figure 46:
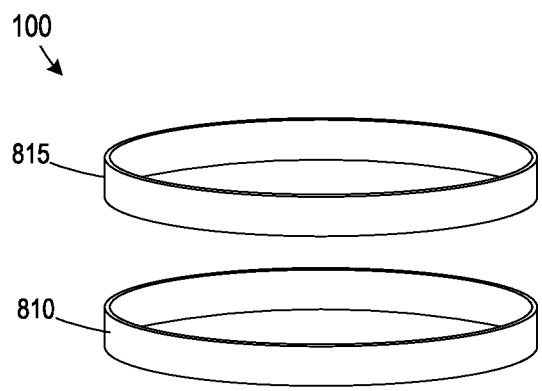

Referring to FIG. 46, the semiconductor arrangement 100 includes a ring-shaped optical device 810 formed in the device layer 310, and a corresponding continuous ring-shaped heater 815 formed above the ring-shaped optical device 810, according to some embodiments. As described above, the ring-shaped heater 815 is formed in the M1 metallization layer 456 and/or the M2 metallization layer 500. The ring-shaped optical device 810 is a micro-ring oscillator, according to some embodiments. The ring-shaped optical device 810 may be an active optical device or a passive optical device.

Figure 47:
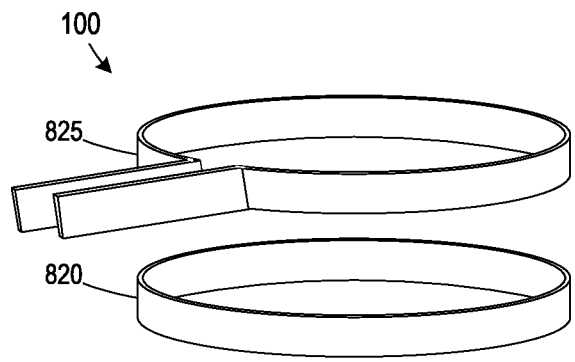

Referring to FIG. 47, the semiconductor arrangement 100 includes a ring-shaped optical device 820 formed in the device layer 310, and a corresponding discontinuous ring-shaped heater 825 formed above the ring-shaped optical device 820, according to some embodiments. As described above, the ring-shaped heater 825 is formed in the M1 metallization layer 456 and/or the M2 metallization layer 500. The ring-shaped optical device 820 is a micro-ring oscillator, according to some embodiments. The ring-shaped optical device 820 may be an active optical device or a passive optical device.

Figure 48:
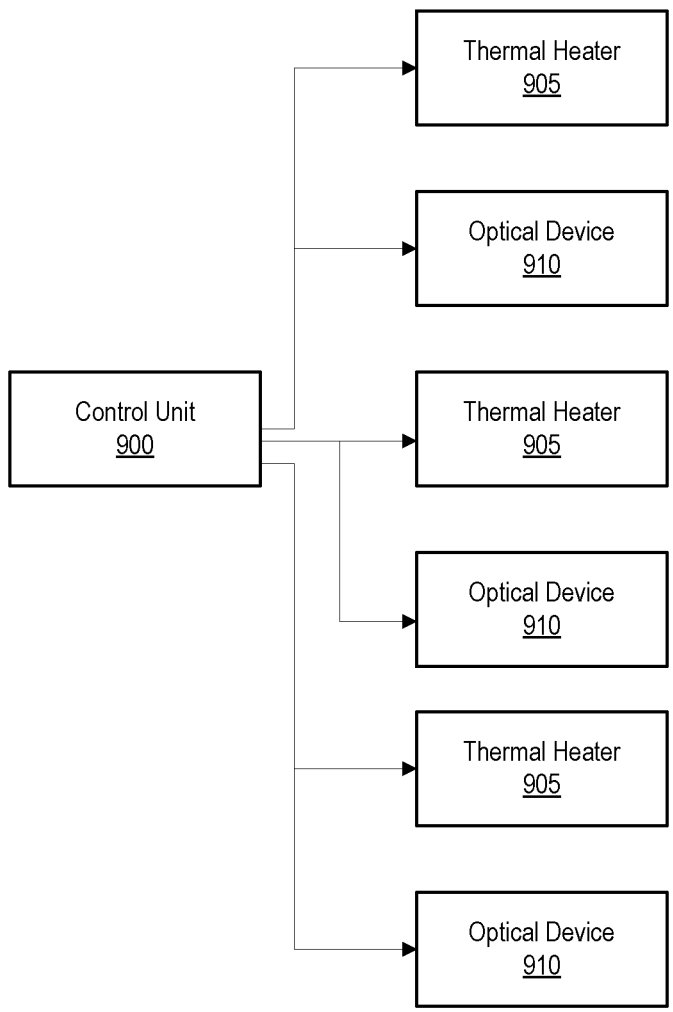
FIG. 48 illustrates controlling a semiconductor arrangement, in accordance with some embodiments.

Referring to FIG. 48, a control unit 900 controls the heaters 905 to tune performance characteristic of optical devices 910, in accordance with some embodiments. The optical devices 910 can be active optical devices or passive optical devices. The semiconductor arrangement 100 can include multiple optical devices 910, some passive, some active. In general, temperature and process variations causes the center wavelength of the optical devices 910 to shift.

Figure 49:
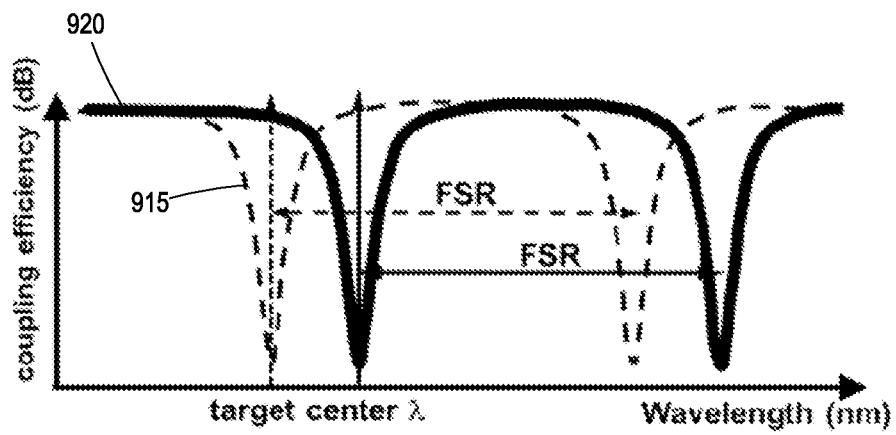
FIG. 49 illustrates temperature related wavelength shifts, in accordance with some embodiments.

Referring to FIG. 49, a diagram illustrating the shift in the center wavelength of an optical device responsive to temperature variations, or process variations, or both temperature and process variations. The control unit 900 of FIG. 48 tests the operation of the optical device 910 to determine its actual characteristic wavelength, represented by a curve 915, relative to its target wavelength, represented by the curve 920. In some embodiments, the control unit 900 uses a feedback control technique to control the output of one or more heaters 905 so that the actual performance represented by the curve 915 shifts to match the target performance represented by the curve 920. The one or more heaters 905 are designed to have the thermal capacity to generate a shift in the operating wavelength of the optical device 910 by at least one free spectral range (FSR).

According to some embodiments, a semiconductor arrangement is provided. The semiconductor arrangement includes a first dielectric layer over an optical device, and a first metallization layer over the first dielectric layer. A first conductive line is in the first metallization layer. A first conductive via is in the first metallization layer and contacts the first conductive line. A second metallization layer is over the first metallization layer. A second conductive line is in the second metallization layer and contacts the first conductive via at a first interface. A heater is over the optical device and has a lowermost surface below the first interface and an uppermost surface above the first interface.

According to some embodiments, a semiconductor arrangement is provided. The semiconductor arrangement includes a first dielectric layer over an optical device, and a first metallization layer over the first dielectric layer. A first conductive line is in the first metallization layer. A first conductive via is in the first metallization layer and contacts the first conductive line. A second metallization layer is over the first metallization layer. A second conductive line is in the second metallization layer and contacts the first conductive via at a first interface. A heater is over the optical device and has a lowermost surface not below the first interface and an uppermost surface above the first interface.

According to some embodiments, a method of forming a semiconductor arrangement is provided. The method includes forming a first dielectric layer over an optical device. A first conductive contact is formed in the first dielectric layer and contacts the optical device. A first metallization layer is over the first dielectric layer. A first conductive line is formed in the first metallization layer and contacts the first conductive contact. A first conductive via is formed in the first metallization layer and contacts the first conductive line. A second metallization layer is formed over the first metallization layer. A second conductive line is formed in the second metallization layer and contacts the first conductive via at a first interface. A heater is formed over the optical device in the second metallization layer.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A semiconductor arrangement, comprising:
   a first dielectric layer over an optical device;
   a first metallization layer over the first dielectric layer;
   a first conductive line in the first metallization layer;
   a first conductive via in the first metallization layer contacting the first conductive line;
   a second metallization layer over the first metallization layer;
   a second conductive line in the second metallization layer contacting the first conductive via at a first interface; and
   a heater over the optical device having a lowermost surface below the first interface and an uppermost surface above the first interface.

2. The semiconductor arrangement of claim 1, wherein the uppermost surface of the heater is below an uppermost surface of the second conductive line.

3. The semiconductor arrangement of claim 1, comprising:
   a third conductive line in the first metallization layer;
   a second conductive via in the first metallization layer contacting the third conductive line; and
   a fourth conductive line in the second metallization layer contacting the second conductive via at a second interface, wherein:
      the heater is between the first interface and the second interface,
      the lowermost surface of the heater is below the second interface, and
      the uppermost surface of the heater is above the second interface.

4. The semiconductor arrangement of claim 3, wherein the uppermost surface of the heater is below an uppermost surface of the fourth conductive line.

5. The semiconductor arrangement of claim 3, comprising:
   a first conductive contact in the first dielectric layer contacting the first conductive line and a first contact region of the optical device; and
   a second conductive contact in the first dielectric layer contacting the third conductive line and a second contact region of the optical device, wherein the heater is between the first conductive contact and the second conductive contact.

6. The semiconductor arrangement of claim 1, comprising:
   a first conductive contact in the first dielectric layer contacting the first conductive line and a first contact region of the optical device.

7. The semiconductor arrangement of claim 6, wherein:
   the first contact region comprises a first material, and
   the second conductive line comprises a second material different than the first material.

8. The semiconductor arrangement of claim 1, comprising:
   a second conductive via in the second metallization layer contacting the second conductive line.

9. A semiconductor arrangement, comprising:
   a first dielectric layer over an optical device;
   a first metallization layer over the first dielectric layer;
   a first conductive line in the first metallization layer;
   a first conductive via in the first metallization layer contacting the first conductive line;
   a second metallization layer over the first metallization layer;
   a second conductive line in the second metallization layer contacting the first conductive via at a first interface; and
   a heater over the optical device and at least partially in the second metallization layer.

10. The semiconductor arrangement of claim 9, wherein a lowermost surface of the heater is below an uppermost surface of the second conductive line.

11. The semiconductor arrangement of claim 9, wherein the heater has a first thickness equal to a second thickness of the second conductive line.

12. The semiconductor arrangement of claim 9, wherein an uppermost surface of the heater is not above an uppermost surface of the second conductive line.

13. The semiconductor arrangement of claim 9, comprising:
   a third conductive line in the first metallization layer;
   a second conductive via in the first metallization layer contacting the third conductive line; and
   a fourth conductive line in the second metallization layer contacting the second conductive via at a second interface, wherein:
      the heater is between the first interface and the second interface,
      and
      an uppermost surface of the heater is above the second interface.

14. The semiconductor arrangement of claim 13, wherein a lowermost surface of the heater is below an uppermost surface of the fourth conductive line.

15. The semiconductor arrangement of claim 14, wherein the uppermost surface of the heater is not above the uppermost surface of the fourth conductive line.

16. The semiconductor arrangement of claim 13, comprising:
   a first conductive contact in the first dielectric layer contacting the first conductive line and a first contact region of the optical device; and
   a second conductive contact in the first dielectric layer contacting the third conductive line and a second contact region of the optical device, wherein the heater is between the first conductive contact and the second conductive contact.

17. A method, comprising:
   forming a first dielectric layer over an optical device;
   forming a first conductive contact in the first dielectric layer contacting the optical device;
   forming a first metallization layer over the first dielectric layer;
   forming a first conductive line in the first metallization layer contacting the first conductive contact;
   forming a first conductive via in the first metallization layer contacting the first conductive line;
   forming a second metallization layer over the first metallization layer;
   forming a second conductive line in the second metallization layer contacting the first conductive via at a first interface; and
   forming a heater over the optical device in the second metallization layer.

18. The method of claim 17, wherein forming the heater comprises:
   forming the heater such that a lowermost surface of the heater is below the first interface and an uppermost surface of the heater is above the first interface.

19. The method of claim 17, wherein forming the heater comprises:
    forming the heater such that a lowermost surface of the heater is not below the first interface and an uppermost surface of the heater is above the first interface.

20. The method of claim 17, comprising:
    forming a second conductive contact in the first dielectric layer contacting the optical device, wherein the heater is between the first conductive contact and the second conductive contact.

\* \* \* \* \*